United States Patent [19]

Belmont

[11] Patent Number: 5,596,728
[45] Date of Patent: Jan. 21, 1997

[54] METHOD AND APPARATUS FOR RESOLVING RESOURCE CONFLICTS AFTER A PORTABLE COMPUTER HAS DOCKED TO AN EXPANSION BASE UNIT

[75] Inventor: Brian V. Belmont, Houston, Tex.

[73] Assignee: Compaq Computer Corporation, Houston, Tex.

[21] Appl. No.: 632,760

[22] Filed: Apr. 16, 1996

Related U.S. Application Data

[63] Continuation of Ser. No. 238,271, May 4, 1994, abandoned.

[51] Int. Cl.$^6$ ............................................. G06F 13/00
[52] U.S. Cl. ..................... 395/281; 364/708.1; 361/683
[58] Field of Search .................................. 395/281–283, 395/750; 364/708.1

[56] References Cited

U.S. PATENT DOCUMENTS

| | | | |
|---|---|---|---|
| 5,237,690 | 8/1993 | Bealkowski et al. | 395/700 |
| 5,265,238 | 11/1993 | Canova, Jr. et al. | 395/500 |
| 5,299,322 | 3/1994 | Arai et al. | 395/275 |
| 5,301,276 | 4/1994 | Kimura | 395/829 |
| 5,313,596 | 5/1994 | Swindler et al. | 395/325 |
| 5,323,291 | 6/1994 | Boyle et al. | 361/686 |
| 5,377,357 | 12/1994 | Nishigaki et al. | 395/800 |
| 5,440,748 | 8/1995 | Sekine et al. | 395/750 |
| 5,454,081 | 9/1995 | Thorne | 395/281 |
| 5,488,572 | 1/1996 | Belmont | 364/514 R |

OTHER PUBLICATIONS

Smartstation, Installation & Operations Guide, Compaq Computer Corp., pp. 4–1 to 4–21, 5–6 to 5–12, (1994).

*Primary Examiner*—Jack B. Harvey
*Assistant Examiner*—Sumati Lefkowitz
*Attorney, Agent, or Firm*—Pravel, Hewitt, Kimball & Krieger

[57] ABSTRACT

A notebook computer system for docking to a motorized expansion base unit. Before the actual docking event occurs, the notebook computer system communicates with the expansion base unit via a sense signal, which is provided by the notebook computer to indicate the power state of the notebook computer. If the expansion base unit determines that the notebook computer is in a proper state for docking, it activates its motor to load the notebook computer. Once docked, the notebook computer runs a resource conflict check routine to determine if resource conflicts occur. A fatal conflict occurs when the resource requirements of bus devices connected to expansion slots in the expansion base unit conflict with the resource requirements of a video controller or hard disk drive connected to the notebook computer. When such a fatal conflict occurs, the notebook computer issues a software eject request to expansion base unit. In response, the expansion base unit undocks the notebook computer. A non-fatal conflict occurs when the resource requirements of the expansion base unit devices conflict with the resource requirements of PCMCIA cards inserted into the PCMCIA slots of the notebook computer. Unlike the case of a fatal conflict, the notebook computer responds to a non-fatal conflict by disabling the expansion slots of the offending devices in the expansion base unit.

16 Claims, 22 Drawing Sheets

METHOD AND APPARATUS FOR RESOLVING RESOURCE CONFLICTS AFTER A PORTABLE COMPUTER HAS DOCKED TO AN EXPANSION BASE UNIT

SPECIFICATION

This is a continuation of application Ser. No. 08/238,271, filed on May 4, 1994 now abandoned.

BACKGROUND OF THE INVENTION

1. FIELD OF THE INVENTION

The invention relates to a portable or notebook computer system capable of being docked to an expansion base unit, and more particularly, to an apparatus and method of disabling expansion devices in the expansion base unit when a resource conflict is determined upon docking.

2. DESCRIPTION OF THE RELATED ART

A development in the computer field is the expansion base system to which a portable or notebook personal computer can be docked. The expansion base unit, which is typically located in the user's office or home, includes connectors for connection to CRT display monitors, ISA expansion cards and other peripheral devices. Since the housing of a notebook computer is rather limited in size, only a limited number of device controllers and connectors can be fitted into the notebook computer. Thus, by providing a means of connection to a notebook personal computer, the expansion base unit allows the notebook computer to take advantage of the additional devices connected to the base unit.

The notebook computer has previously been inserted into the expansion base unit by manually pushing the notebook computer into a connector provided in the base unit. To remove the notebook computer from the base unit, the user typically must either pull on the notebook computer itself or push an eject button. The notebook computer typically must be in an "OFF" state before the notebook computer can be properly inserted into the expansion base unit. If the user forgets to place the notebook computer into the "OFF" state, certain problems may arise. When a notebook computer in an improper state is inserted into the expansion base unit, the notebook computer will be unaware that it has been docked at the expansion base unit and thus will be unable to communicate with the base unit, or the notebook computer may be rebooted, resulting in potential data loss.

More recently, a motorized expansion base unit has been developed. Such a system is described in patent application Ser. No. 08/188,554 entitled "Method and Apparatus for Sensing and Changing the State of a Computer Before Connecting the Computer to or Disconnecting the Computer from an Expansion Unit," which is assigned to the assignee of the present application, and which is hereby incorporated by reference. This motorized expansion base is not prior art to the present invention, as the present invention was developed concurrently and for use with this motorized expansion base. This description is provided in this section to help provide an overview of the specific problem addressed by the present invention.

The motorized docking method is generally similar to the loading of a tape into a VCR. The user pushes the notebook computer into a slot in the docking base unit. In response to the pressure, the docking base unit causes the motor to grip the notebook computer and to pull it into position for connection to the docking connector. The motorized expansion base unit is designed to refuse the docking or undocking requests of a notebook computer until the notebook computer is placed into a proper state. Thus the user would be forced to place the notebook computer into the proper state before the expansion base unit will accept the notebook computer, thereby avoiding any communication or data loss problems.

In addition, the system described in the referenced patent application utilizes an operating system according to the Plug and Play specification developed by Microsoft Corp., Intel Corp., Compaq Computer Corp. and Phoenix Technologies, Ltd. One feature of a Plug and Play computer system is that expansion devices connected to the computer system can be configured at run time. This enables a notebook computer to be docked to the expansion base unit while the notebook computer is in STANDBY mode. In STANDBY mode, most of the components in a computer system are off. The only components kept active are those necessary to store the state of the computer system. Since the notebook computer can be reconfigured by the operating system, the notebook computer need not be rebooted to allow it to recognize the expansion base unit. As a result, user convenience is enhanced, since much more time is required for a computer system to reboot than to exit from STANDBY mode. For a detailed description of the Plug and Play specification, refer to Plug and Play ISA Specification (1994), Intel Corporation and Microsoft Corporation and Plug and Play BIOS Specification (1993), Compaq Computer Corporation, Phoenix Technologies Ltd., and Intel Corporation. The specifications are hereby incorporated by reference.

Another problem associated with docking a notebook computer to an expansion base unit is that the notebook computer and the expansion base unit may have bus devices having resource conflicts. The expansion base unit is capable of receiving various bus card peripheral devices, some of which may conflict with certain resources of the peripheral devices contained in the notebook computer. If the notebook computer is docked without resolving the conflicts, an error may occur if the conflicting resources are utilized. The typical user has no way of knowing in advance whether such a conflict may occur. Thus, it is desirable that a method be developed to identify and resolve such conflicts.

SUMMARY OF THE PRESENT INVENTION

According to the present invention, a portable or notebook computer for docking to an expansion base unit performs a determination of whether a resource conflict occurs once the notebook computer is docked to an expansion base unit. In the preferred embodiment, the notebook computer includes PCMCIA slots for receiving PCMCIA cards. The expansion base unit includes expansion slots for receiving expansion devices. If the resource requirements of the expansion devices conflict with the resource requirements of the PCMCIA cards, the resource conflict error is non-fatal. As a result, the expansion devices can be disabled to remove the resource conflict. The notebook computer identifies which expansion device is causing the conflict by sequentially enabling one expansion slot at a time. If the enabled expansion device causes a resource error, a conflict error flag corresponding to that expansion slot is set. The process is repeated for all the expansion slots. After the conflict check is performed, the notebook computer disables all expansion slots whose conflict error flags are set. In this manner, the notebook computer automatically determines which devices are in conflict and disables those devices to resolve the resource conflict issue.

BRIEF DESCRIPTION OF THE DRAWINGS

A better understanding of the present invention can be obtained when the following detailed description of the preferred embodiment is considered in conjunction with the following drawings, in which.

DETAILED DESCRIPTION OF THE PREFERRED EMBODIMENT

Figure 1:
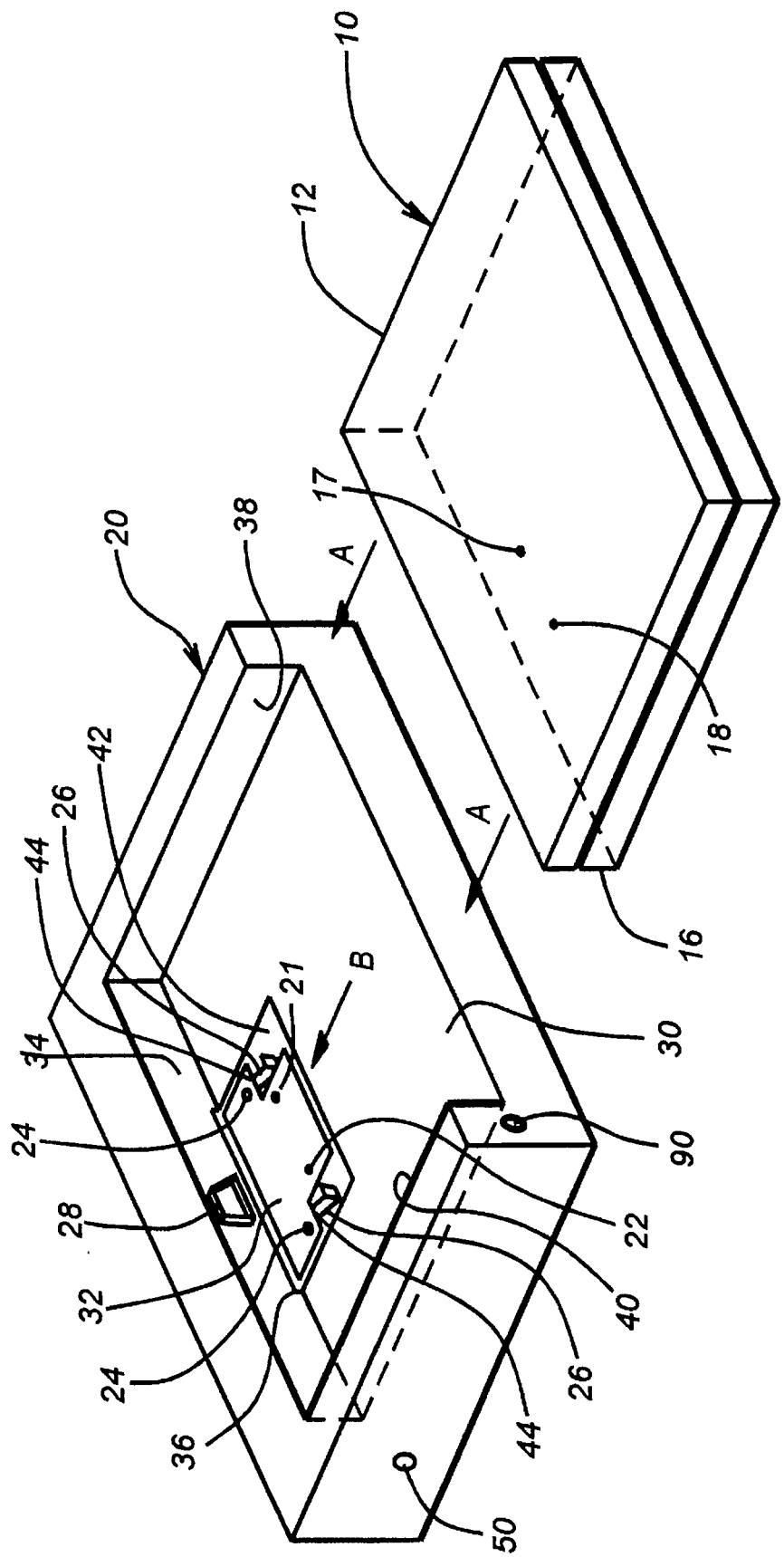
FIG. 1 illustrates a notebook computer for docking to an expansion base unit.

Referring now to FIG. 1, a desktop expansion base unit 20 is shown for connection to a notebook computer 10. The notebook computer 10 is inserted into the expansion base unit 20 in the direction of arrows A. Two electrical sense pads 17 and 18 are located on the bottom surface of the notebook computer 10. The sense pad 17 corresponds to a reference voltage, such as ground, and the sense pad 18 corresponds to a signal SENSE for indicating the state of the notebook computer 10. The expansion base unit 20 has a containment area defined by a floor surface 30, a right wall 38, a left wall 40 and a rear wall 34. A docking port connector 28 protrudes from the rear wall 34. A depressed area 42 is located in the floor 30 into which a computer control plate 32 sits such that the top surface of the control plate 32 is substantially flushed with the floor 30. Two electrical sense pads 21 and 22 corresponding to the electrical sense pads 17 and 18 on the notebook computer 10 are located on the control plate 32. Two grab hooks 26 are rotatably connected to the control plate 32 by hinges 44. The control plate 32 slides in the direction of arrow B into the opening 36.

The notebook computer 10 is inserted into the expansion base unit 20 by sliding it into the computer containment area until it is pressed up against a pair of blocks 24, which are provided to position the notebook computer 10 such that the electrical sense pads 17 and 18 align with and contact the electrical sense pads 21 and 22, respectively. The notebook computer 10 is thus able to indicate to the expansion base unit 20 the state of the notebook computer 10.

If the notebook computer 10 is in a proper state, that is, generally the notebook computer 10 is in a standby or off state, a motor 218 (FIG. 3A) located inside the housing of the expansion base unit 20 pulls the control plate 32 in the direction of arrow B. When the control plate 32 slides into the expansion base unit 20, the grab hooks 26 rotate up to grip the notebook computer 10, pulling the computer 10 into electrical connection with the expansion port connector 28. The grab hooks 26 also tend to hold the notebook computer 10 in such a position that the electrical sense pads 17 and 18 are in constant electrical contact with the electrical sense pads 21 and 22, respectively. An eject button 90 is located on the left front side of the expansion base unit 20. If the eject button 90 is depressed by the user while the notebook computer 10 is docked at the expansion base unit 20, the motor 218 undocks the notebook computer 10 by pushing the control plate 32 back out in the opposite direction of the arrow B. A key lock 50 is provided on the left side of the expansion base unit 20 to allow the user to inhibit unauthorized docking or undocking of the notebook computer 10.

Figure 2:
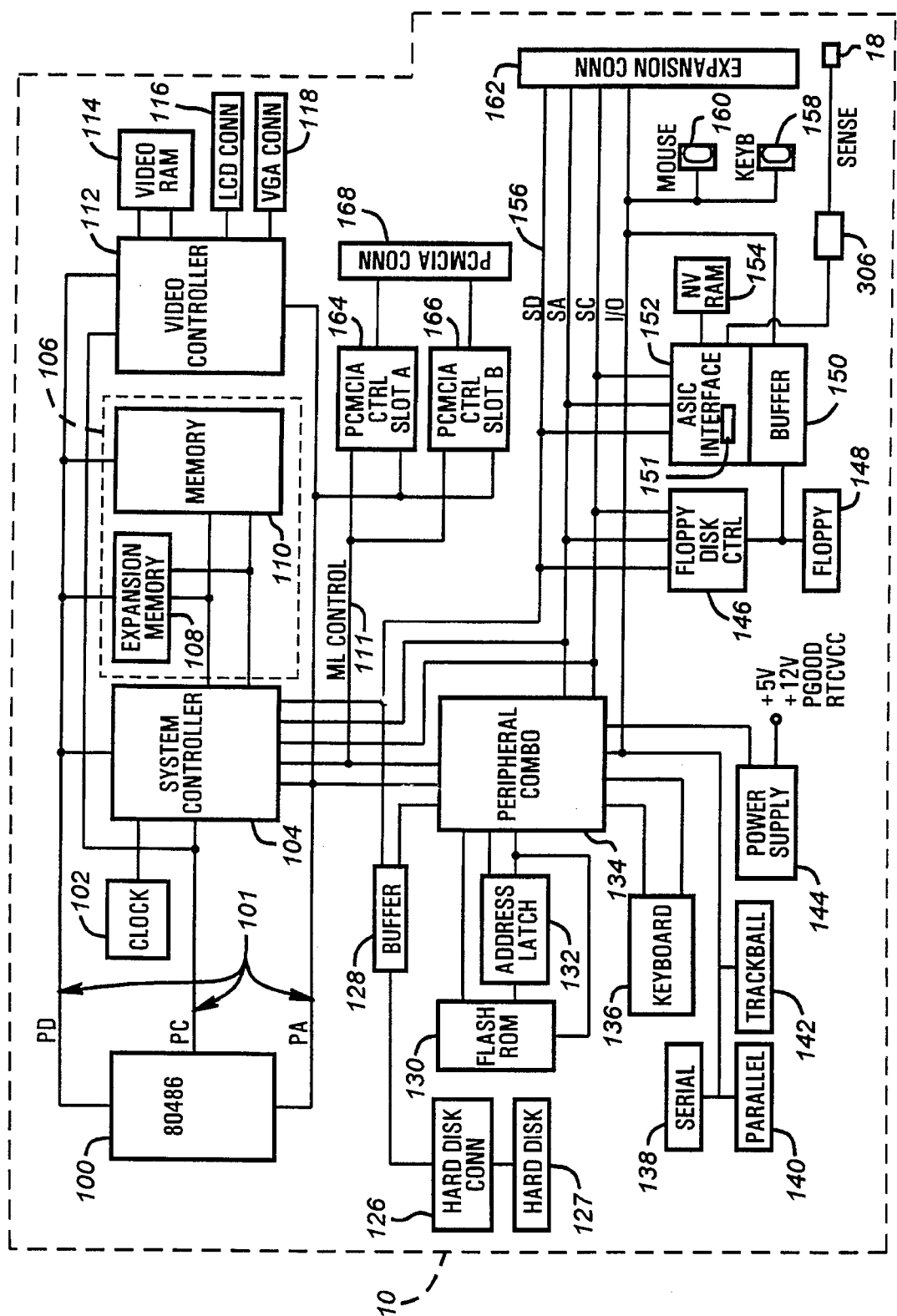
FIG. 2 is a block diagram of the notebook computer of FIG. 1.

Referring now to FIG. 2, the notebook computer 10 according to the present invention is shown. A microprocessor or CPU 100, preferably an S-series i486 processor from Intel Corporation (Intel), forms the main computing element of the computer 10. The microprocessor 100 is connected to a system controller 104 via a local bus 101, which consists of three buses: a PD or processor data bus, a PA or processor address bus and a PC or processor control bus. Connected to the system controller 104 is a clock generator 102. Included as part of the system controller 104 is a memory controller, which provides the proper address and control signals to main memory 106. The main memory 106 is connected to the PD or processor data bus. The main memory 106 includes a base memory 110, which is configured to 4 Megabytes or 8 Megabytes in the preferred embodiment, and is upgradable with expansion memory 108. The system controller 104 also provides certain control signals on an ML control bus 111. The ML control bus 111 signals are used in conjunction with address and data signals placed on the PA bus by the system controller 104 during intervals when the system controller 104 has gained access to the PA bus from the processor 100. This dual use of the PA bus reduces the pin count of the system controller 104.

An ISA bus 156 is also included as part of the computer 10. The ISA bus 156 has four major components, the SA or system address bus, the SD or system data bus, the SC or system control bus and the I/O bus. The system controller 104 further includes control circuitry that provides the necessary capabilities to convert between local bus 101 cycles and ISA bus 156 cycles. The system controller 104 also includes buffers to provide the necessary data and address transceiving functions between the local bus 101 and the ISA bus 156.

The computer 10 includes certain fundamental components such as an interrupt system, a DMA controller and a number of timers, as well as arbitration of the ISA bus 156. These functions are all contained in a peripheral controller 134, which is connected to the SA, SC, I/O, PA and ML control buses. The peripheral controller 134 also provides the necessary control signals to a hard disk buffer 128, which is connected between the SD bus and a hard disk connector 126 for connection with a hard disk drive 127. The peripheral controller 134 also provides an interface to a keyboard 136, an internal trackball 142, a serial port 138 and a parallel port 140. In addition, the peripheral controller 134 provides control signals for a FLASH EEPROM 130, which stores certain basic operating routines to allow the computer to boot and perform certain fundamental system functions. These routines are generically referred to as the system BIOS. A portion of the EEPROM 130 is used to store the Video BIOS, which is used to initialize the video system. That portion of the EEPROM 130 is generally referred to as the Video BIOS ROM.

A power supply 144 provides the power supply voltages for the notebook computer 10. The voltages generated by the power supply 144 includes a 3.3 volt power voltage +3.3 V, a 5 volt power voltage +5 V, a 12 volt power voltage +12 V, a signal PGOOD indicating the availability of system power and a voltage RTCVCC. The voltage RTCVCC is connected to a real time clock (RTC) and a CMOS memory located in the system controller 104.

A floppy disk controller 146 is connected to the ISA bus 156. The floppy disk controller 146 provides control signals to a floppy disk drive (not shown) through a connector 148. The floppy disk controller 146 also provides data and address transceiving between the SD and SA buses, respectively, and the floppy disk drive. Connected between the floppy connector 148 and the I/O bus is a buffer 150. The buffer 150 is implemented inside an ASIC 152. The ASIC 152 also provides control signals for an NVRAM 154, which is non-volatile memory for storage of configuration and status information. The ASIC 152 receives an external SMI signal from a sense circuit 306. As will be described in greater detail in FIGS. 4 and 5, the sense circuit provides a signal SENSE indicative of the state of the notebook computer 10. The voltage level of the signal SENSE is controlled by control signals provided by the ASIC 152 to the sense circuit 306. The signal SENSE is provided through the sense pad 18 to the corresponding sense pad 22 on the expansion base unit 20. In response to the external SMI request asserted by the sense circuit 306, the ASIC 152 notifies the system controller 104 that an external SMI request has been asserted. This causes the system controller 104 to assert an SMI request to the CPU 100. In response, the CPU 100 invokes a special SMI handler to handle the docking and undocking operation of the notebook computer 10.

An expansion connector 162 is connected to the ISA bus 156 for connection to the expansion base unit 20 for docking purposes. Also connected to the I/O bus are a mouse port 160 and a keyboard port 158 for connection with an external mouse and external keyboard, respectively. A PCMCIA connector 168 has two PCMCIA slots, which provide expansion capabilities for the computer system C to provide additional memory if desired or to receive certain communication options, such as modems and networks cards. The two PCMCIA slots in the connector 168 are connected to two PCMCIA controllers 164 and 166. The PCMCIA controller 164 is used for the control of PCMCIA slot A and the PCMCIA controller 166 is used for the control PCMCIA slot B. The PCMCIA controllers 164 and 166 are connected to the PA and ML control buses.

The video system in the notebook computer 10 comprises a video controller 112, a Video Random Access Memory (VRAM) 114, an LCD connector 116, a VGA connector 118, and an LCD panel (not shown). The video controller 112 is connected to the local bus 101, and it provides video and control signals to the LCD panel through the LCD connector 116. The video controller 112 also can provide video signals to an external CRT monitor (not shown) through the VGA connector 118. The VRAM 114 is connected to the video controller 112 for storage of video data, and the video ROM 113 contains the power up information for the video controller 112.

Figure 3A:
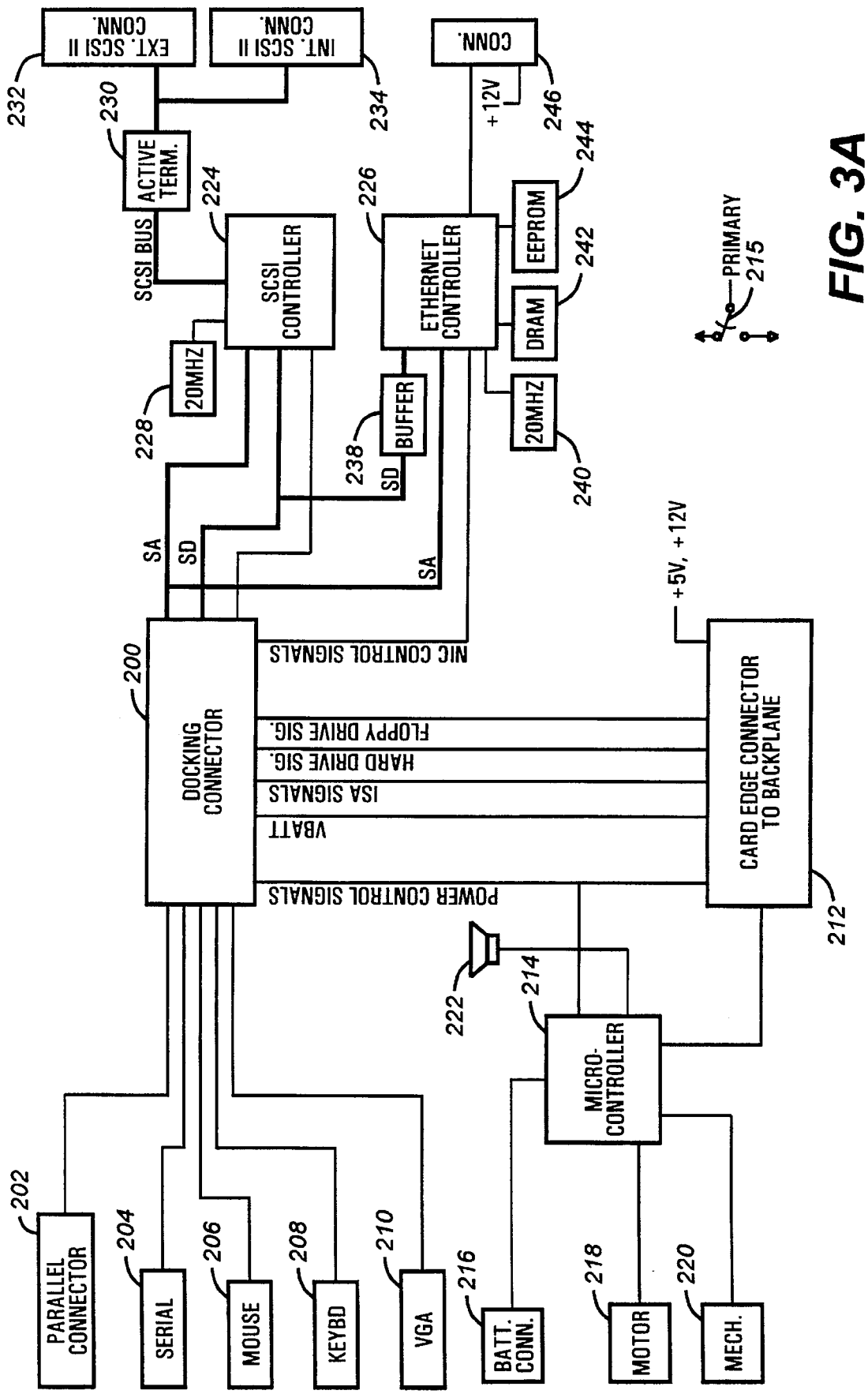
FIGS. 3A and 3B are a block diagram of the expansion base unit of FIG. 1.
Figure 3B:
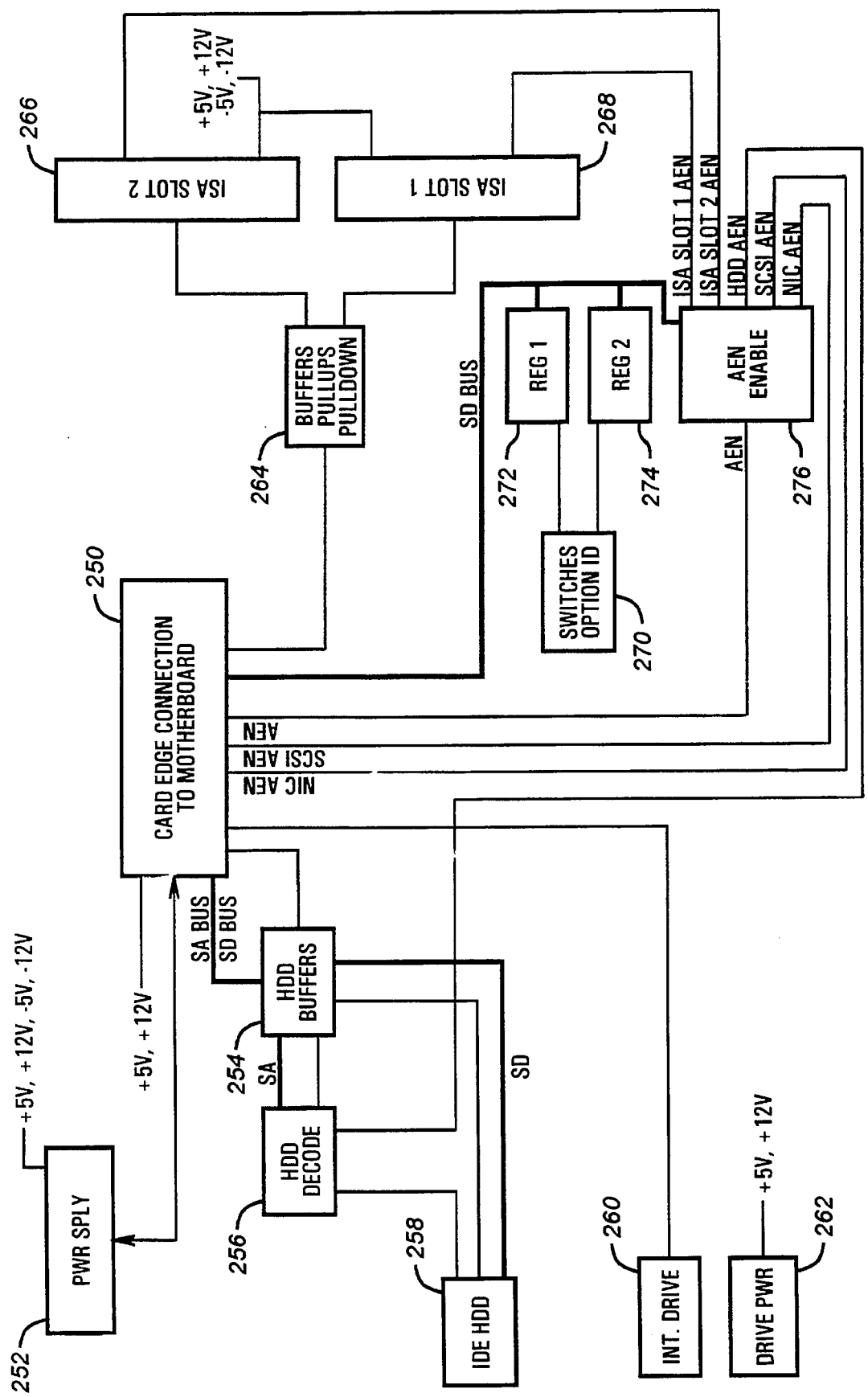

Referring now to FIGS. 3A and 3B, a block diagram of the expansion base unit 20 is shown, where FIG. 3A shows the motherboard and FIG. 3B shows the backplane. The connector 162 in the notebook computer 10 connects to a docking connector 200 when the notebook computer 10 is docked to the expansion base unit 20. The docking connector 200 provides signals to a parallel port connector 202, a serial port connector 204, a mouse connector 206, a keyboard connector 208 and a video connector 210. Various power control signals, battery signals, ISA bus signals, hard disk drive signals and floppy disk drive signals are connected between the docking connector 200 and a backplane edge connector 212. A microcontroller 214 is also connected to the power control signals. The functions of the microcontroller 214 include providing control signals to a motor 218 to dock and undock the notebook computer 10, providing power management functions for the expansion base unit 20 and the notebook computer 10, providing for fast charging of the notebook computer battery through a battery contact 216, and performing battery voltage and temperature measurements and battery error detections and indications. The microcontroller 214 also provides signals to a speaker 222, which provides an audible signal whenever certain error conditions occur, including errors during docking or undocking. Further, the microcontroller 214 receives connections to various switches via a mechanical interface 220.

The docking connector 200 also provides signals to a SCSI controller 224 and an Ethernet controller 226. The ISA address and data buses SA and SD are connected to the SCSI controller 224 and Ethernet controller 226. A 20 MHz clock generator 228 provides clock signals to the SCSI controller 224, which is connected to an external SCSI connector 232 and an internal SCSI connector 234. An active terminator 230 is provided for proper termination of the SCSI bus. The ISA data bus SD is connected to the Ethernet controller 226 through a buffer 238. A 20 MHz clock generator 240 provides clock signals to the Ethernet controller 226. The Ethernet controller 226 is also connected to a DRAM 242 and an EEPROM 244. The DRAM 242 provides data storage for the Ethernet controller 226, and the EEPROM 224 contains the configuration and power-up information for the Ethernet controller 226. The Ethernet controller 226 is connected to an Ethernet network through a connector 246.

The backplane edge connector 212 is connected to an edge connector 250 in FIG. 3B. The edge connector 250 provides power control signals to a power supply 252. The power supply 252 provides power supply voltages +5 V, +12 V, −5 V and −12 V. The power supply 252 also provides a signal PWRGOOD to indicate that the power supply voltages +5 V, +12 V, −5 V and −12 V are within operating tolerances. The hard disk drive control signals and the ISA buses SA and SD are provided to an IDE hard disk drive 258 through buffers 254. The ISA address signals SA are provided to IDE decode logic 256, which decodes the address signals to enable the hard disk drive 258. The control signals and the SD bus are provided directly from the buffers 254 to the hard disk drive 258. The signals required for the operation of the floppy disk drive 260 are connected directly between the floppy disk drive 260 and the edge connector 250. In addition, the floppy disk drive 260 has a separate power supply unit 262.

The expansion base unit 20 also includes two ISA slots 266 and 268 for connection to ISA expansion devices. The expansion slots 266 and 268 are connected through a circuit block 264 to the edge connector 250. The circuit block 264 includes buffers and various pull-up and pull-down devices required for expansion bus devices connected through ISA slots 266 and 268. Switches 270 are provided to set an option ID for the expansion base unit 20. The states of the ID switches are stored in registers 272 and 274 and provided to the ISA data bus SD. The registers 272 and 274 are addressable by the computer 10 to provide control of other functions in the expansion base unit 20 and to obtain status of various items, such as the ID switches.

The data bus SD is also connected to AEN enable logic 276. The AEN enable logic 276 is connected to the ISA address enable signal AEN, which is provided by the notebook computer 10 through connectors 200, 212 and 250. By supplying the AEN enable logic 276 with certain values on the data bus SD, the notebook computer 10 can selectively enable or disable AEN signals provided to different devices in the expansion base unit 20. Thus the notebook computer 10 can enable or disable any one of the following AEN signals: SL2AEN for the ISA slot 266, SL1AEN for the ISA slot 268, HDDAEN for the hard disk drive 258, SAENSCSI for the SCSI controller 224 and NICAEN for the Ethernet controller 226. When an AEN signal is disabled, the device corresponding to that AEN signal is disabled from communicating with the rest of the system.

A switch 215 is also included on the motherboard (FIG. 3A) to indicate whether the hard disk drive 127 in the notebook computer 10 or the hard disk drive 258 in the expansion base unit 20 is the primary or C drive. The switch 215 is connected to a signal PRIMARY. If the signal PRIMARY is set high, then the hard disk drive 258 is the primary or C drive and the hard disk drive 127 is the secondary or D drive. If the signal PRIMARY is set low, the reverse is true.

Figure 4:
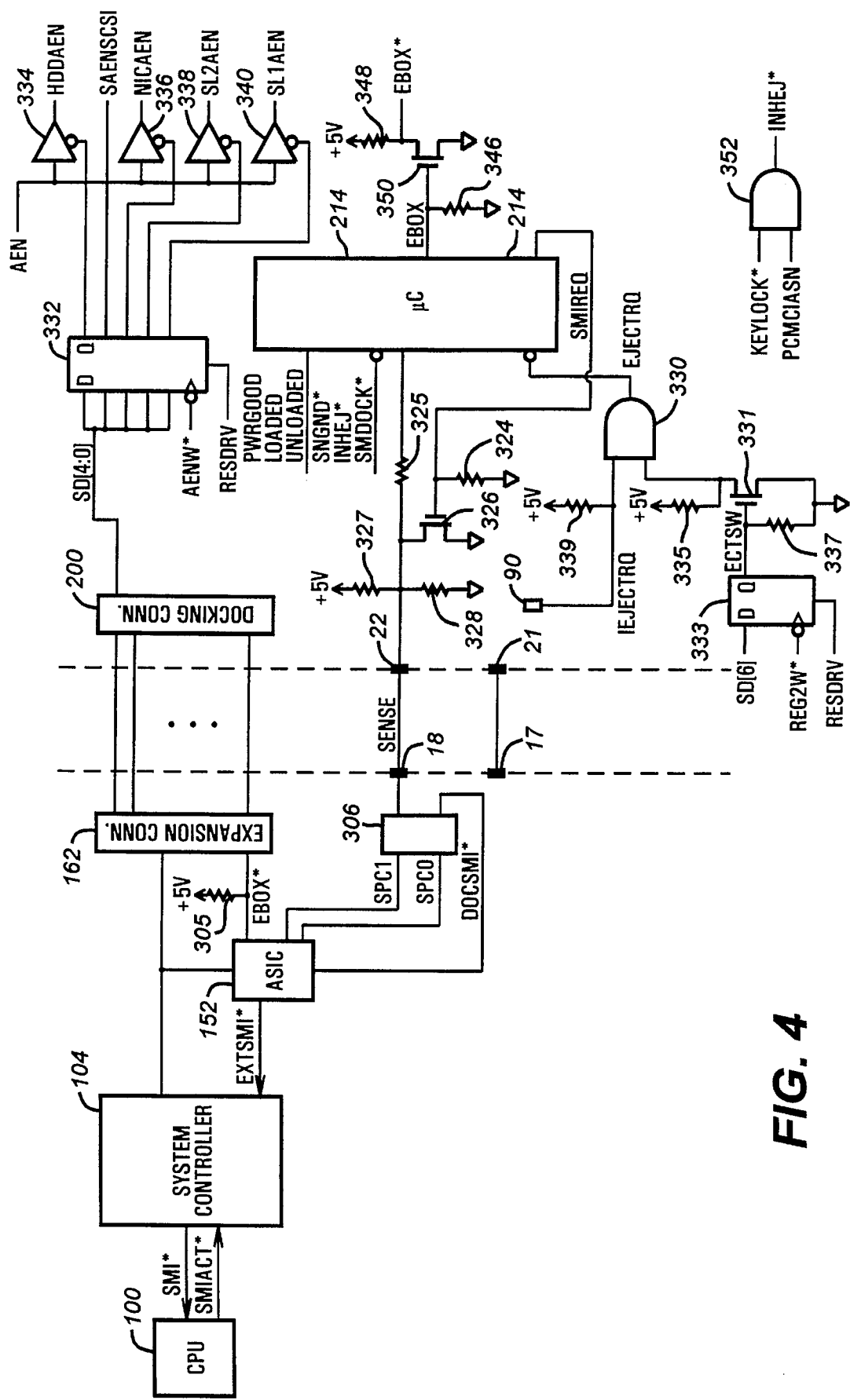
FIG. 4 is a block diagram of portions of the notebook computer and expansion base unit for control of docking and undocking operations.

Referring now to FIG. 4, a block diagram is shown of portions of the notebook computer 10 and the expansion base unit 20 which control the docking and undocking operations. The ASIC 152 communicates with the sense circuit 306 via control lines SPC0 and SPC1. The sense circuit 306 provides the signal SENSE, which, along with a reference ground signal are provided to the expansion base unit 20 through the sense pads 18 and 22 and 17 and 21, respectively. The control signals SPC0 and SPC1 indicate the state of the notebook computer 10. The sense circuit 306 converts the control signals SPC0 and SPC1 into an analog voltage level on the signal SENSE, which is provided to the microcontroller 214 through a resistor 325. An analog-to-digital (A/D) converter inside the microcontroller 214 converts the voltage level on the signal SENSE into a digital value. Thus, from the voltage level of the signal SENSE, the microcontroller 14 is able to determine the state of the notebook computer 10.

The microcontroller 214 provides an output signal SMIREQ to the gate of an N-channel MOSFET 326. A resistor 324 is connected between the gate of the transistor 324 and ground. The source of the transistor 326 is connected to ground and its drain is connected to the signal SENSE. A resistor 328 is connected between the signal SENSE and ground and a resistor 327 is connected between the signal SENSE and the supply voltage +5 V. The resistors 327 and 328 ensure that the SENSE input to the microcontroller 214 is at a voltage level between 0.75 V and 1.75 V when the notebook computer 10 is not present.

The sense circuit 306 provides a signal DOCSMI* to the ASIC 152. When asserted low, the signal DOCSMI* indicates to the ASIC 152 that an external SMI request has occurred when the SENSE signal is grounded. In response, the ASIC 152 asserts a signal EXTSMI* low, which is connected to the system controller 104. The system controller 104 then asserts the signal SMI* low to the CPU 100, which responds by invoking a special SMI handler to control the docking and undocking operations. The CPU 100 also asserts a signal SMIACT* low to indicate to the system controller 104 that the CPU 100 is currently running an SMI handler.

Figure 5:
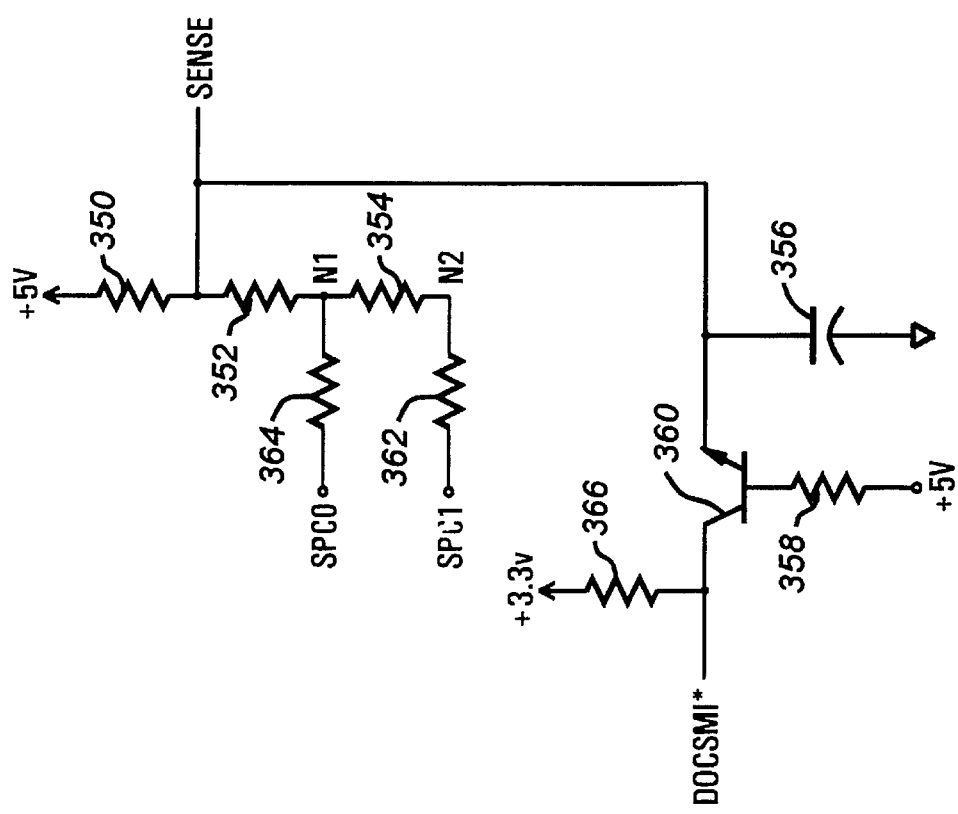
FIG. 5 is a schematic diagram of a circuit for producing a signal indicating the state of the notebook computer.

Referring now to FIG. 5, a schematic diagram of the sense circuit 306 is shown. The control signals SPC0 and SPC1 are connected to resistors 364 and 362, respectively. The other side of the resistor 364 is connected to node N1 and the other side of the resistor 362 is connected to node N2. A resistor 354 is connected between nodes N1 and N2. A resistor 352 is connected between node N1 and the signal SENSE, which is connected to the computer system voltage signal +5 V through a resistor 350. In the preferred embodiment, the signals SPC0 and SPC1 define one of four states. The first state is the state ALWAYS, which is true when the notebook computer 10 is powered off. In this state, the notebook computer 10 can always be docked to or undocked from the expansion base unit 20. The second state is the state OK, which is true when the notebook computer 10 is in STANDBY or SLEEP mode. In STANDBY mode, the notebook computer 10 is not completely powered off. Certain portions of the notebook computer 10 which are necessary to store the state of the system are powered on. The remaining components in the notebook computer 10 are powered off to conserve energy. In the STANDBY mode, the notebook computer 10 can be returned to its power on state relatively quickly. In the state OK, the notebook computer 10 is also allowed to dock to or undock from the expansion base unit 20, but only if the expansion base unit 20 can verify that the state OK is asserted for a minimum amount of time. The third state indicated by the signal SENSE is the state CONSIDER. In this state, the notebook computer 10 is powered on and running applications; however, those applications can easily be closed to allow the notebook computer 10 to transition to STANDBY mode. The last state is the state NEVER, in which the notebook computer 10 is running an application from which it cannot exit to place itself into STANDBY mode. In this case, the expansion base unit 20 will deny all docking or undocking requests.

In the state ALWAYS, the power supply voltage +5 V in the notebook computer 10 is pulled to ground. As a result, the signal SENSE is also pulled down to a voltage between 0 and 0.75 volts. The state NEVER is indicated by the control signals SPC0 and SPC1 both asserted low. Consequently, the voltage divider circuit developed by the resistor 350 and resistors 52, 354, 364 and 362 cause the signal SENSE to be at a voltage preferably between 1.75 and 3.5 volts. In the state OK, both the signals SPC0 and SPC1 are held high, which causes the signal SENSE to be driven to a voltage above 4.5 volts. If one of the signals SPC0 and SPC1 is low and the other is high, the voltage of the signal SENSE is preferably between 3.5 and 4.5 volts. If the notebook computer 10 is not present, that is its sense pads 17 and 18 are not electrically contacted to the sense pads 21 and 22 of the expansion base unit 20, the voltage level of the signal SENSE is driven to a voltage between 0.75 V and 0.75 V by the resistors 327 and 328 in the expansion base unit 20. Thus, five possible voltage levels are generated on the signal SENSE to indicate the state of the notebook computer 10.

The signal SENSE is further connected to the emitter of an NPN transistor 360. The base of the transistor 360 is connected to the voltage signal +5 V through a resistor 358, and its collector is connected to a signal DOCSMI*. A capacitor 356 is connected between the signal SENSE and ground to filter out any RF noise. A pull-up resistor 366 is connected between the signal DOCSMI* and the system voltage signal +3.3 V to keep the signal DOCSMI* at a high state when the transistor 360 is off, as will be true if the SENSE signal is not grounded by the MOSFET 326.

Referring back to FIG. 4, if the microcontroller 214 determines that the notebook computer 10 is in the state ALWAYS, the microcontroller 214 responds by running the motor 218 to undock or dock the notebook computer 10. If the notebook computer 10 is in the state OK, the microcontroller 214 waits for a predetermined period of time to verify that the notebook computer 10 is still in the state OK. If so, the microcontroller 214 runs the motor 218 to dock or undock the notebook computer 10. In the preferred embodiment, the notebook computer 10 has to present the state OK on the signal SENSE before actually entering into STANDBY mode because the notebook computer 10 may not be able to change to the state OK after entering STANDBY. Therefore, the time period between when the notebook computer 10 presents the state OK at its state pad 18 and when the motor 218 actually begins to run must be sufficiently long to ensure that the notebook computer 10 has time to place itself into STANDBY mode.

If the microcontroller 214 determines that the notebook computer 10 is in the state NEVER, the microcontroller 214 does not permit the motor 218 to operate. Rather the microcontroller 214 indicates to the user that docking or undocking has been denied, preferably in the form of an audible beep signal from the speaker 222 (FIG. 3A). If the microcontroller 214 determines that the notebook computer 10 is in the state CONSIDER, the microcontroller 214 briefly pulses high the signal SMIREQ, which causes the N-channel MOSFET transistor 326 to turn on. When the transistor 326 is turned on, it pulls the signal SENSE low, which in turn causes the transistor 360 to turn on. As a result, the signal DOCSMI, is pulled low. As explained earlier, this causes the CPU 100 to invoke a special SMI handler to handle the docking and undocking operation.

The notebook computer 10 can also send an eject request to the expansion base unit 20 by writing to a portion 333 of one of the registers 270 and 272. The register portion 333 is latched on the falling edge of a signal REG2W*, which is asserted when the proper address value on the address bus SA and the ISA write command signal IOWC* are presented. The D input of the register portion 333 is connected to the data bus SD[6]. The output of the register portion 333 is a signal EJECTSW, which is connected to the gate of an N-channel MOSFET 331. A resistor 337 is also connected between the signal EJECTSW and ground. The source of the MOSFET 331 is connected to ground, and its drain is connected to one input of an AND gate 330. A resistor 335 is connected between the drain of the MOSFET 331 and the system voltage +5 V. Thus, if a 1 is written to the register portion 333, the transistor 331 is turned on. As a result, the input of the AND gate is pulled low, which in turn causes a signal EJECTRQ to be driven low. The signal EJECTRQ is provided to an interrupt input of the microcontroller 214. When the signal EJECTRQ is asserted low, this indicates to the microcontroller 214 that an eject request is pending. When a 0 is written to the register portion 333, the MOSFET 331 is turned off. As a consequence, the resistor 335 pulls the input of the AND gate 330 high. The second input of the AND gate 330 is connected to a signal IEJECTRQ, which is provided by the eject button 90. When the user depresses the eject button 90, the signal IEJECTRQ is pulled low. When the eject button 90 is released, the signal IEJECTRQ is pulled high by a resistor 339. Thus, by pressing the eject button 90, the user causes the eject signal EJECTRQ to pulse low momentarily to cause an eject interrupt to be asserted to the microcontroller 214.

The ISA data bus signals SD[4:0] are provided to the D inputs of a register 332 in the AEN enable logic 76. On the falling edge of a signal AENW*, which is asserted low when the address of the register 332 and the ISA write command signal IOWC* are provided, the state of the data bus SD[4:0] is loaded into the register 332. The outputs of the register 332 are provided to the enable inputs of tristate buffers 334, 336, 338 and 340 and to the AEN signal SAENSCSI. The inputs of the tristate buffers 334–340 are all connected to the ISA enable signal AEN. The outputs of the tristate buffers 334–340 are connected to the hard disk drive AEN signal HDDAEN, ethernet controller AEN signal NICAEN, expansion slot 2 AEN signal SL2AEN, and expansion slot 1 AEN signal SL1AEN, respectively. The outputs of the tristate buffers 334–340 are all connected to pull-up resistors (not shown) to pull the corresponding signals high when the tristate buffers 334–340 are disabled. Thus, through the use of the register 332, the notebook computer 10 can enable or disable various devices in the expansion base unit 20.

The microcontroller 214 also receives signals PWRGOOD, LOADED, UNLOADED, SNGND*, INHEJ*, and SMDOCK*. The signal PWRGOOD indicates that the expansion base unit 20 power supply voltages are within operating limits. The signals LOADED and UNLOADED indicate whether the notebook computer 10 is docked or undocked, respectively. The signal SNGND*, provided by the notebook computer 10, indicates the type of notebook computer 10. The signal INHEJ*, which inhibits docking or undocking of the notebook computer 10, is provided by an AND gate 352, whose inputs are connected to signals KEYLOCK* and PCMCIASN. If either of the signals KEYLOCK* or PCMCIASN are asserted low, the microcontroller 214 ignores any eject requests asserted on the signal EJECTRQ. The signal KEYLOCK* is provided by the keylock 50 (FIG. 1). If asserted low, the signal KEYLOCK* prevents docking or ejection of the notebook computer 10. The signal PCMCIASN, when asserted low, indicates that oversized PCMCIA cards or PCMCIA cards having attached cables are inserted into the PCMCIA slots 164 and 166 of the notebook computer 10. The signal PCMCIASN prevents ejection of the notebook computer 10 when the PCMCIA slots 164 and 166 are thus occupied to avoid damaging the oversized PCMCIA cards or the cables and PCMCIA cards. Finally, the signal SMDOCK* is provided to the microcontroller 214 to notify it if the smart docking capability of the expansion base unit 20 is enabled. Smart docking refers to the ability of the expansion base unit 20 to recognize the state of the notebook computer 10 and properly respond to docking and undocking requests based on that state.

The microcontroller 214 also outputs a signal EBOX, which is connected to the gate of an N-channel transistor 350 is tied to ground and its drain is connected to the system voltage +5 V through a resistor 344. The drain of the transistor 350 is also connected to a signal EBOX*. A resistor 346 is connected between the signal EBOX and ground. The combination of the resistor 348 and the N-channel MOSFET 350 acts as an inverter for the signal EBOX. The signal EBOX* is asserted low to let the notebook computer 10 know that it is docked to the expansion base unit 20. The EBOX* signal is provided to the notebook computer 10 directly through the connectors 162 and 200. In the preferred embodiment, certain problems will arise if the notebook computer 10 is docked with the signal EBOX* asserted low. Therefore, just before the notebook computer 10 is docked, the signal EBOX* is deasserted high to allow the notebook computer 10 to be docked properly.

Referring now to FIGS. 6A–6F, a flow diagram of the motor control routine executed by the microcontroller 214 is shown. The process by which the microcontroller 214 controls operation of the motor 218 for docking and undocking operations is described in detail. Starting at step 390, it is determined if the notebook computer 10 is present. If not, control proceeds to step 392, where the expansion base unit 20 is powered off if it is not already so. If the notebook computer 10 is present, control proceeds to step 394, where it is determined if the signal INHEJ* is asserted low. If so, that indicates the signal KEYLOCK* is being asserted low by the key lock 50 (FIG. 1) or the PCMCIASN signal is low because of the presence of certain PCMCIA cards. If locked or present, control proceeds to step 396, where an alarm is sounded through speaker 222 to let the user know docking or undocking is not allowed. If the lock 50 is not enabled or PCMCIA cards are not present, control proceeds to step 400, where the microcontroller 214 determines if the smart docking capability is enabled. Smart docking refers to the ability of the expansion base unit 20 to respond to a docking or undocking request based upon the state of the notebook computer 10. In addition, smart docking allows the user to inhibit unauthorized ejection of a docked notebook computer 10. If the smart docking capability is not enabled, control proceeds to step 402, where it is determined if the expansion base unit 20 is powered on. If not, control proceeds to step 460 in FIG. 6E to start the operation of the motor 218. If it is determined in step 402 that the expansion base unit 20 is powered on, then control proceeds to step 403, where the expansion base unit 20 is powered off. Control then proceeds to step 460. Thus, when smart docking is not enabled, this ensures that the entire system is in the off state when docking is being performed. Once docked, the user can return power to the system to boot up the notebook computer 10. The power on self test (POST) procedure during booting ensures that resource conflicts are checked.

If it is determined in step 400 that the smart docking capability is enabled, control proceeds to step 406. In step 406, the microcontroller 214 determines the state of the notebook computer 10 by checking the voltage of the signal SENSE. If the state NEVER is indicated, then control proceeds to step 407, where an audible alarm is sounded on the speaker 222 (FIG. 3A) to let the user know that the notebook computer 10 cannot be docked or undocked from the expansion base unit 20. From step 407, control returns to the main routine on the microcontroller 214. If it is determined in step 406 that the notebook computer 10 is in the state OK, control proceeds to step 410 in FIG. 6B. If the state ALWAYS is indicated by the signal SENSE, control proceeds directly to step 460 to start operation of the motor 218. If the state CONSIDER is indicated in step 406, control proceeds to step 408, where the signal SMIREQ is pulsed high for a period of preferably 3.36 milliseconds. From step 408, control proceeds to step 410.

Figure 6A:
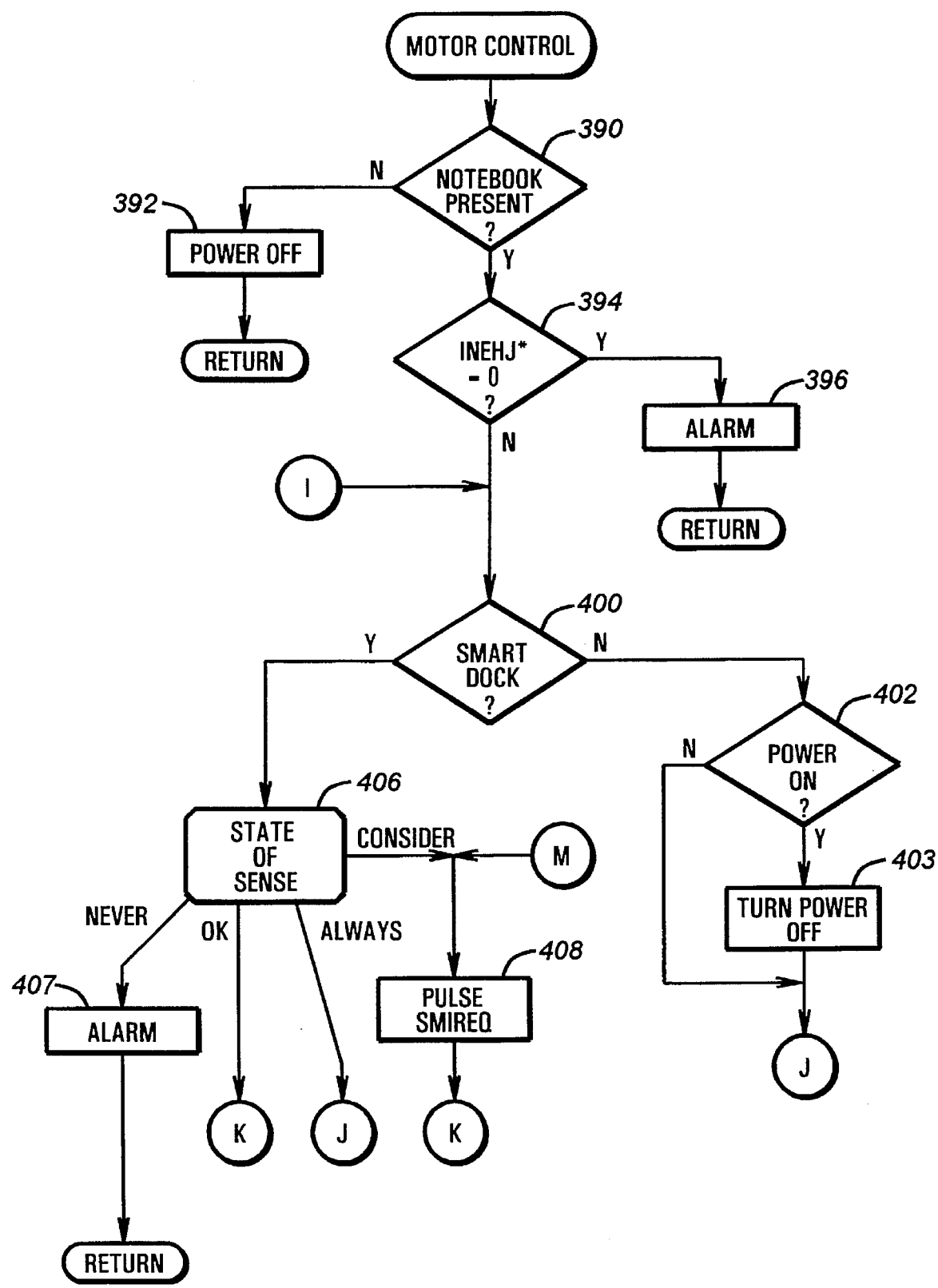
FIGS. 6A to 6F are a flow diagram of the motor control routine of a microcontroller in the expansion base unit of FIG. 1.
Figure 6B:
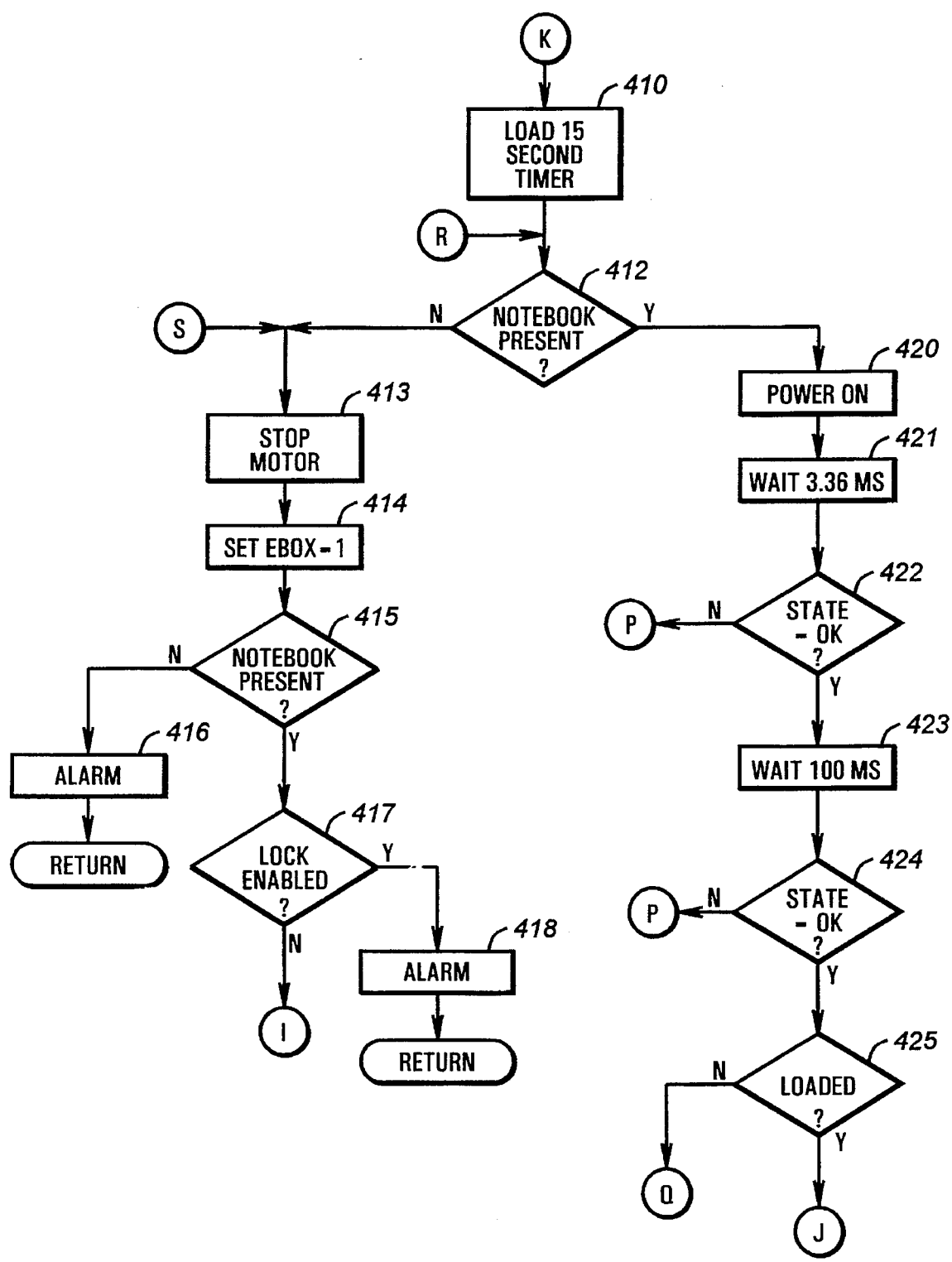
Figure 6C:
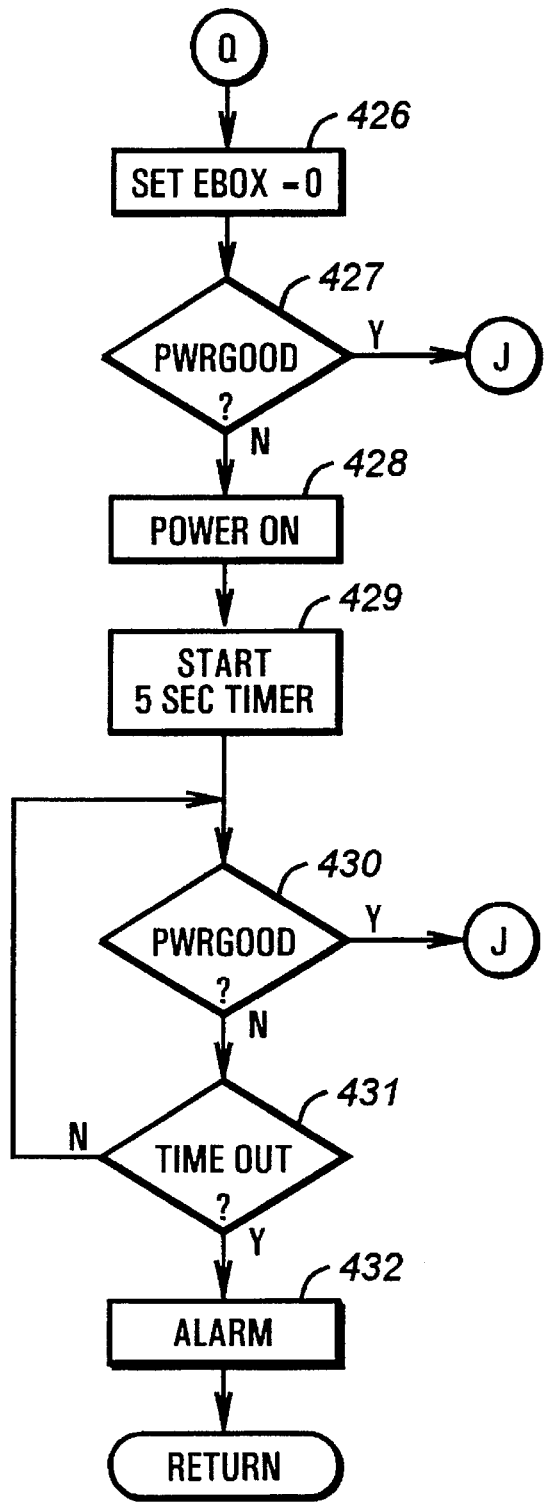

As discussed, two conditions cause the microcontroller 214 to proceed to step 410 in FIG. 6B. The two conditions occur when the notebook computer 10 is in the state OK or in the state CONSIDER. In step 410, a 15-second timer in the microcontroller 214 is started. From step 410, control proceeds to step 412, where it is determined if the notebook computer 10 is present. As discussed in FIG. 4, the notebook computer 10 is not present if the signal SENSE is between 0.75 V and 1.75 V. If the notebook computer 10 is not present, control proceeds to step 413, where the motor is stopped and turned off. Proceeding next to step 414, the signal EBOX is asserted high. Control next proceeds to step 415, where it is determined again if the notebook is present. In the time period that it took the microcontroller 214 to transition from step 412 to step 415, the sense pads 18 of the notebook computer 10 could have been placed into contact with the sense pads 22 of the expansion base unit 20, causing the microcontroller 214 to detect that the notebook computer 10 is present. If it is determined in step 415 that the notebook computer 10 is still not present, control proceeds to step 416, where the expansion base unit 20 is powered off. Control then returns to the main routine. If it is determined in step 415 that the notebook computer 10 is present, control proceeds to step 417, where it is determined if the signal INHEJ is asserted low, which indicates that docking or undocking of the notebook computer 10 is not allowed. If INHEJ* is not asserted, control returns back to step 400 in FIG. 6A. However, if INHEJ* is asserted, control proceeds to step 418, where an audible alarm is sounded to indicate the docking or undocking operation has failed. From step 418 control returns to the main routine.

Returning now back to step 412, if it is determined that the notebook computer 10 is present, control proceeds to step 420, where the expansion base unit 20 is turned on if it is not already on. From step 420, control proceeds to step 421, where the microcontroller 214 remains for a delay period of approximately 3.36 milliseconds. After the delay, control proceeds to step 422, where the microcontroller 214 rechecks the state of the signal SENSE. If the state OK is indicated, control proceeds to step 423, where the microcontroller 214 is delayed for a period of 100 milliseconds. The delay is asserted to allow the notebook computer 10 to properly place itself into STANDBY mode after the state OK is indicated on the signal SENSE. When the sense pads 17 and 18 on the notebook computer 10 are initially contacted to the sense pads 21 and 22 on the expansion base unit 20, the signal SENSE may bounce outside the voltage levels corresponding to the actual state of the notebook computer 10. Thus, it is desirable that the 100 ms debouncing period be provided, especially during a docking operation. After 100 milliseconds, control proceeds to step 424, where the microcontroller 320 again checks the state of the signal SENSE. If the state OK is indicated, control proceeds to step 425, where it is determined if the notebook computer 10 is loaded. If so, control proceeds to step 460 to start operation of the motor 218. If not, control proceeds to step 426, where the signal EBOX* is set low. In the preferred embodiment, if the notebook computer 10 is docked while the signal EBOX, is asserted, the notebook computer 10 may reset. Thus, before docking the notebook computer 10 while it is in STANDBY mode, the signal EBOX* is disabled. After docking, the signal EBOX* is reasserted to let the notebook computer 10 know it is docked. Proceeding next to step 427, it is determined if the signal PWRGOOD is set high, which indicates that the power supply voltages in the expansion base unit 20 are within tolerance limits. If so, control proceeds to step 460 to start operation of the motor 218. If the signal PWRGOOD is not high, control proceeds to step 428, where the expansion base unit 20 is turned on if not already on. Control then proceeds to step 429, where a 5 second timer is started. Control next proceeds to step 430, where it is determined if the signal PWRGOOD has been asserted high. If so, control proceeds to step 460 to start the motor operation. If not, control proceeds to step 431 to determine if the timer has timed out. If not, control returns to step 430 to determine again if the signal PWRGOOD has been asserted high. If the 5 second timer has timed out in step 431, control proceeds to step 432, where an audible alarm is sounded to let the user know that the undocking process has failed. Control then returns to the main routine.

Figure 6D:
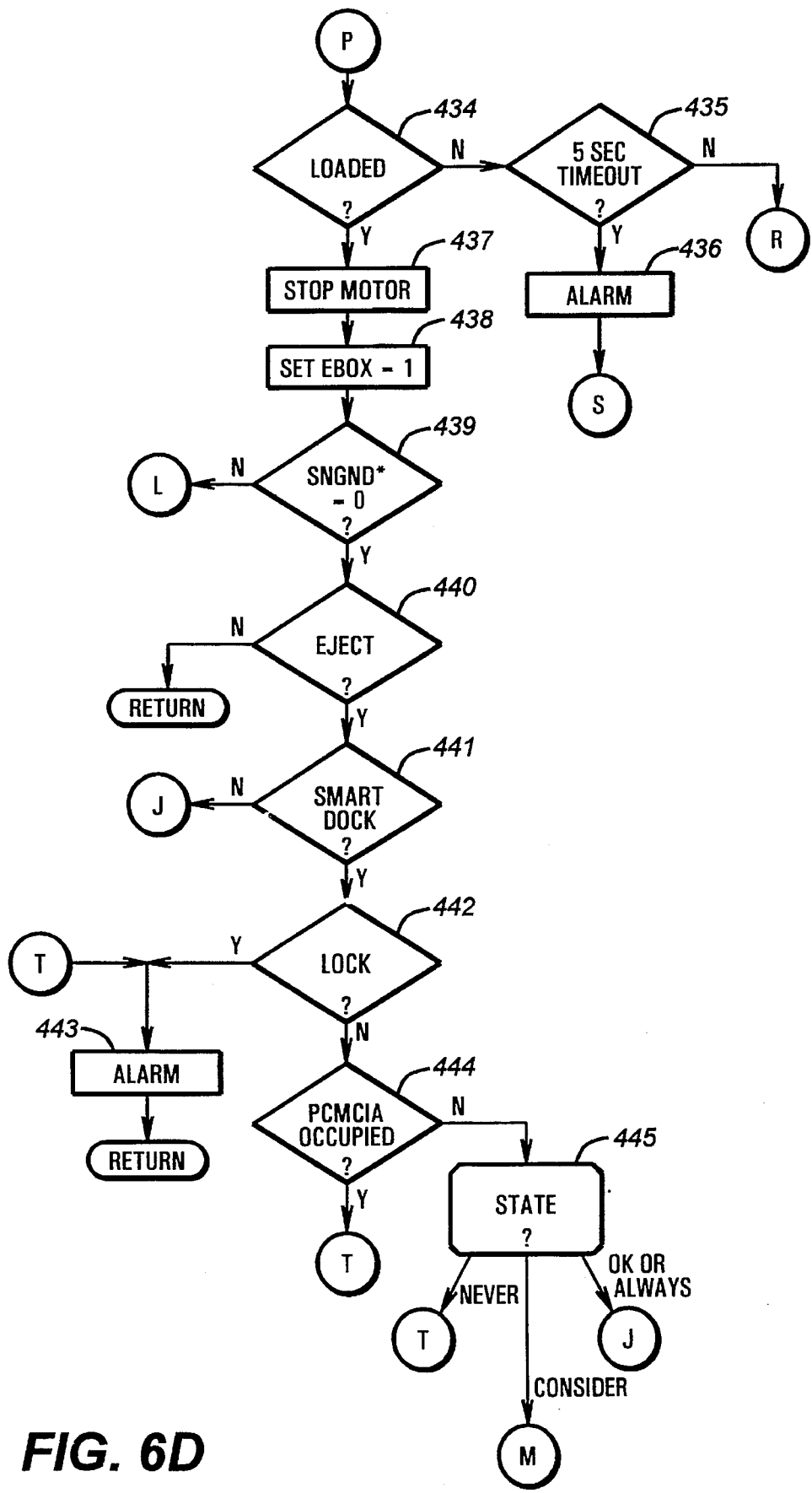

If in either step 422 or 424, the signal SENSE has changed state and no longer indicates the state OK, control proceeds to step 434 in FIG. 6D, where it is determined if the notebook computer 10 is currently loaded as indicated by the signal LOADED. If not loaded, control proceeds to step 435, where it is determined if the 15 second timer started in step 410 has timed out. If not, control returns to step 412, where the process is repeated until either the signal SENSE indicates the state OK or the 15 second timer times out. If it is determined in step 435 that the 15 second timer has timed out, control proceeds to step 436, where an audible alarm is sounded to let the user know of an error condition. From step 436, control proceeds to step 413 in FIG. 6B to stop the motor 218.

If it is determined in step 434 that the notebook computer 10 is loaded as indicated by the signal LOADED being asserted high, control proceeds to step 437. If the notebook computer 10 is loaded, that indicates an undocking operation may be desired. To undock the notebook computer 10, the microcontroller 214 does not need to confirm that the signal SENSE indicates the state OK after the 100 millisecond delay period. In an undocking operation, the sense pads 17 and 18 on the notebook computer 10 are already in contact with the sense pads 21 and 22 on the expansion base unit 20. As a result, the noise issue that is of concern during a docking operation is not present in an undocking operation. In step 437, the motor 218 is stopped and turned off. Next, in step 438, the signal EBOX is set high. Proceeding next to step 439, the state of the signal SNGND*, which indicates the type of notebook computer 10, is determined. If the signal SNGND* is deasserted high, control proceeds directly to step 440 in FIG. 6D to allow the notebook computer 10 to be undocked. If the signal SNGND* is asserted low, control proceeds to step 440, where the microcontroller determines if the signal EJECTRQ is asserted low to indicate an eject request. If an eject is not requested, control returns to the main routine. If the signal EJECTRQ is asserted low, control proceeds to step 441, where it is determined if the smart docking capability is enabled. If not, control proceeds directly to step 460 to start operation of the motor 218. If the smart docking capability is enabled, control proceeds from step 441 to step 442, where it is determined if the ejection of the notebook computer 10 is inhibited, as determined by the state of the signal INHEJ*. If it is, control proceeds to step 443, where an audible alarm is sounded to the user. Control returns from step 443 to the main routine. If ejection is not inhibited, control proceeds to step 444, where it is determined if an oversized PCMCIA card is inserted in the PCMCIA connector 168. If either of the PCMCIA slots 164 or 166 in the connector 168 is occupied, an attempt to undock the notebook computer 10 would damage the oversized PCMCIA cards. If it is determined in step 444 that either of the PCMCIA slots are occupied, control proceeds to step 443 to sound the alarm. If the PCMCIA slots are not occupied, control proceeds to step 445, where the microcontroller 214 determines the state of the notebook computer 10. If the notebook computer 10 is in the state NEVER, control proceeds to step 443 to sound an audible alarm. If the notebook computer 10 is in the state CONSIDER, control proceeds to step 408 in FIG. 6A, where the signal SMIREQ is again pulsed high. If the notebook computer 10 is still in the state CONSIDER at this stage, the external SMI request DOCSMI* is again issued in step 408 to cause the CPU 100 to place the notebook computer 10 into STANDBY mode. Thus, returning control to step 408 ensures that the notebook computer 10 is in STANDBY mode before it can be undocked. Finally, if it is determined in step 445 that the signal SENSE indicates the state OK or the state ALWAYS, control proceeds to step 460 to start operation of the motor 218.

Figure 6E:
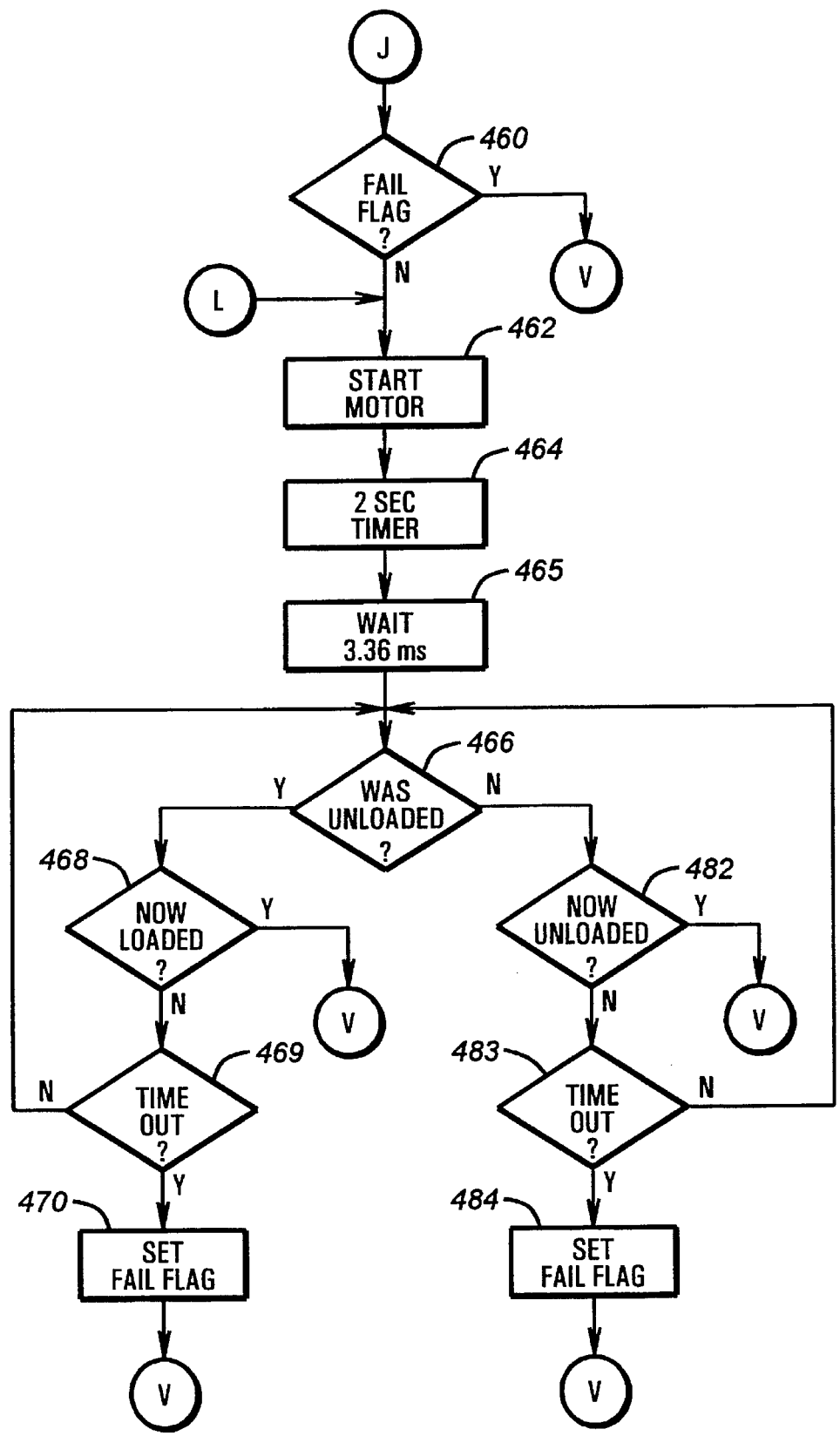
Figure 6F:
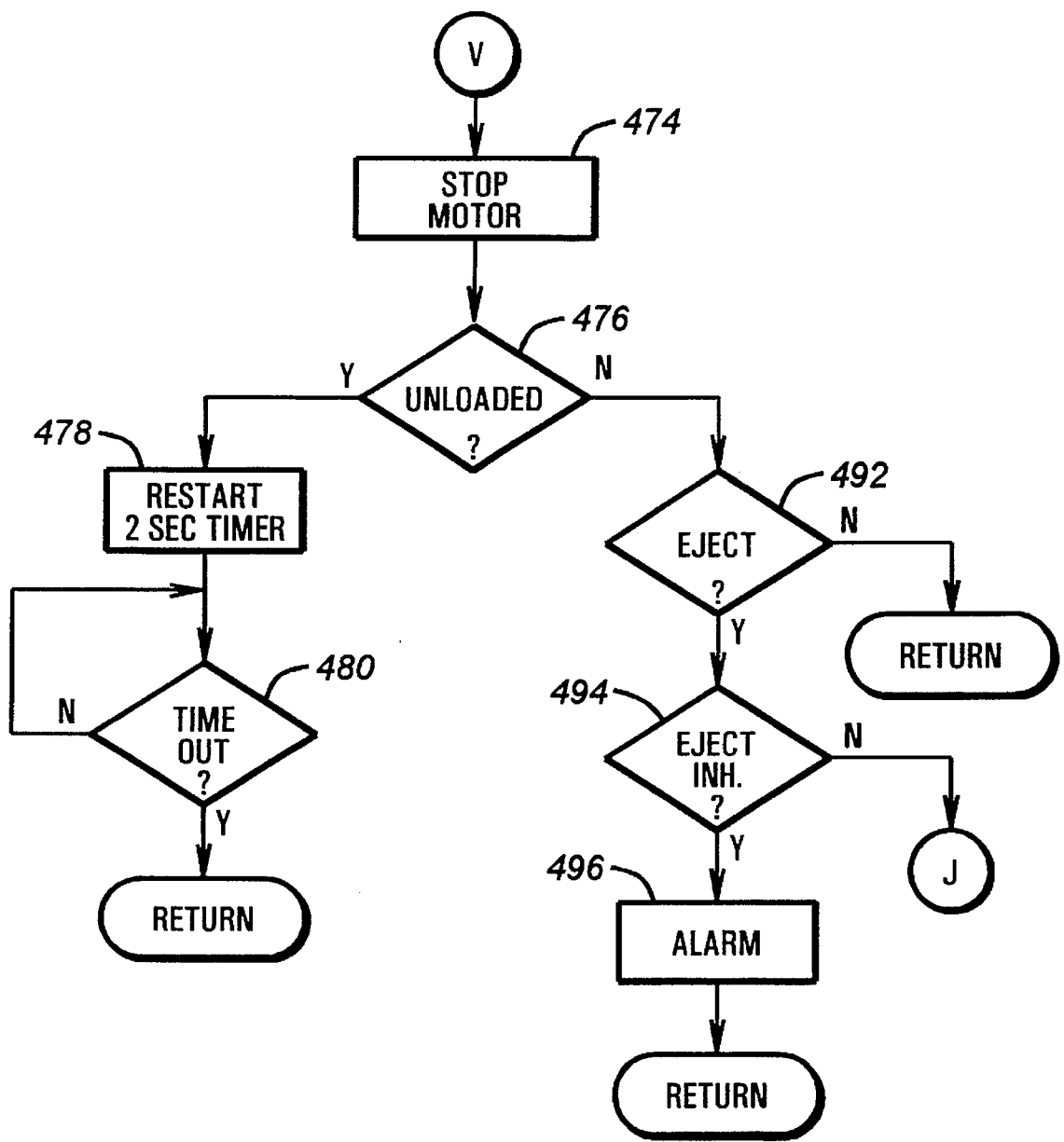

Proceeding now to step 460 in FIG. 6E, it is determined if a FAIL flag has been set to indicate a motor failure. If a motor failure is indicated, control proceeds directly to step 474 in FIG. 6F to prevent the motor 218 from running. If not, control proceeds to step 462, where the motor 218 is turned on. Next in step 464, a two second timer is started. Proceeding next to step 465, a delay of 3.36 milliseconds is invoked. After the delay, control proceeds to step 466, where it is determined if the notebook computer 10 was previously loaded or unloaded before the motor 214 started running. If the notebook computer 10 was unloaded, control proceeds to state 468, where it is determined if the notebook computer 10 is currently loaded or not. If the notebook computer is currently loaded, then that indicates a successful docking operation has just occurred and control proceeds to step 474, where the motor 214 is stopped and turned off.

In step 468, if it is determined that the notebook computer 10 is still unloaded, control proceeds to step 469, where it is determined if the 2 second timer set in step 464 has timed out. If not, control returns to step 466, where the process is repeated to determine if the notebook computer 10 has been loaded. If it is determined in step 469 that the 2 second timer has timed out, control proceeds to step 470, where the FAIL flag is set to indicate a motor failure and an audible alarm is started. Control then proceeds to step 474.

In step 474, the motor 214 is stopped and turned off. Control then proceeds to step 476, where it is determined if the notebook computer 10 is unloaded, as indicated by the signal UNLOADED. If the notebook computer 10 is unloaded, control proceeds to step 478, where a two second timer is started. Next, control proceeds to step 480, where it is determined if the motor has timed out. The microcontroller 214 stays in step 480 for 2 seconds, within which time a notebook-present indicator signal inside the microcontroller 214 is reset to indicate that the notebook computer 10 is no longer present. Control then is returned to the main routine.

Proceeding now back to step 466, if it is determined that the notebook computer 10 was previously loaded, control proceeds to step 482, where it is determined if the notebook computer 10 currently is loaded or unloaded. If the notebook computer 10 is currently unloaded, that indicates a successful undocking operation has occurred. Thus control proceeds to step 474, where the motor is stopped and powered off. If it is determined in step 482 that the notebook computer 10 is still loaded, control proceeds to step 483, where it is determined if the 2 second timer started in step 464 has timed out. If not, control returns to step 466 to determine if the notebook computer 10 has undocked. If the notebook computer 10 has not undocked and the 2 second timer times out in step 483, control proceeds to step 484, where the FAIL flag is set and the alarm is sounded. The microcontroller 214 next proceeds to step 474, where the motor is stopped and turned off. From step 474, control proceeds to step 476, where it is determined if the notebook computer 10 is unloaded. If not, control proceeds to step 492, where it is determined if an eject request has been asserted. If not, control returns to the main program. If an eject request is asserted, indicating that the user has pushed the eject button 90 again, control proceeds to step 494, where it is determined if ejection of the notebook computer 10 is inhibited, as determined by the state of the signal INHEJ\*. If it is determined in step 494 that undocking is not allowed, control proceeds to step 496, where an audible alarm is sounded. From step 496, control is returned to the main program. If in step 494 it is determined that eject is not inhibited, control returns to step 460, where another attempt is made at running the motor 214 to attempt to eject the notebook computer 10.

The preceding has described how the microcontroller 214 responds to signals provided by the notebook computer 10 to operate the motor 214. Next, a detailed description will be provided of the functions of the notebook computer 10, and more particularly, the functions of portions of the SMI handler and operating system. As discussed above, the microcontroller 214 pulses the signal SMIREQ high when it determines that the notebook computer is in the state CONSIDER. This causes the signal SENSE to be pulsed low, which causes the sense circuit 306 to pulse the signal DOCSMI\* low.

Figure 7A:
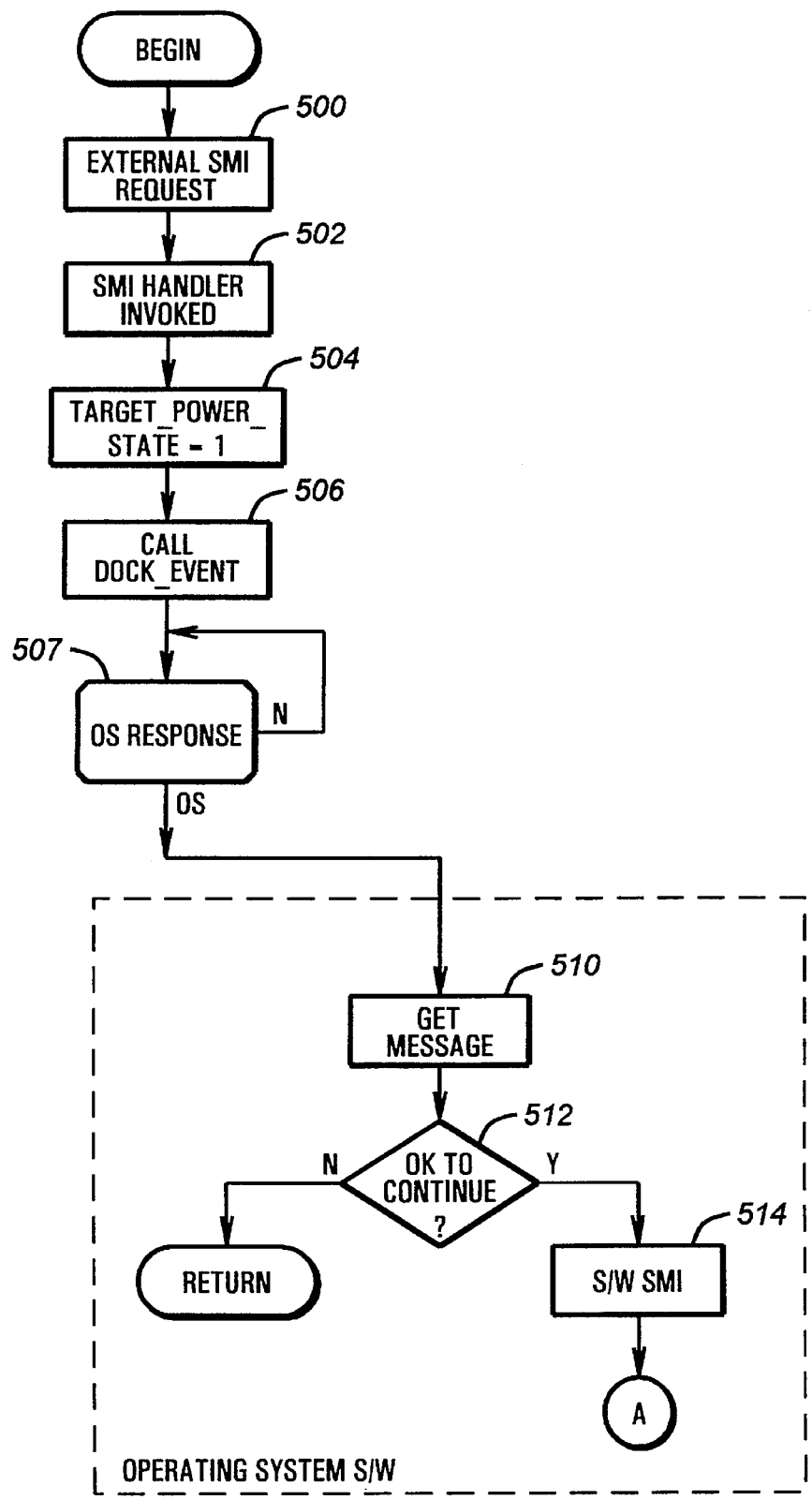
FIGS. 7A and 7B are a flow diagram of the functions of the operating system software and SMI handler of the notebook computer of FIG. 1.
Figure 7B:
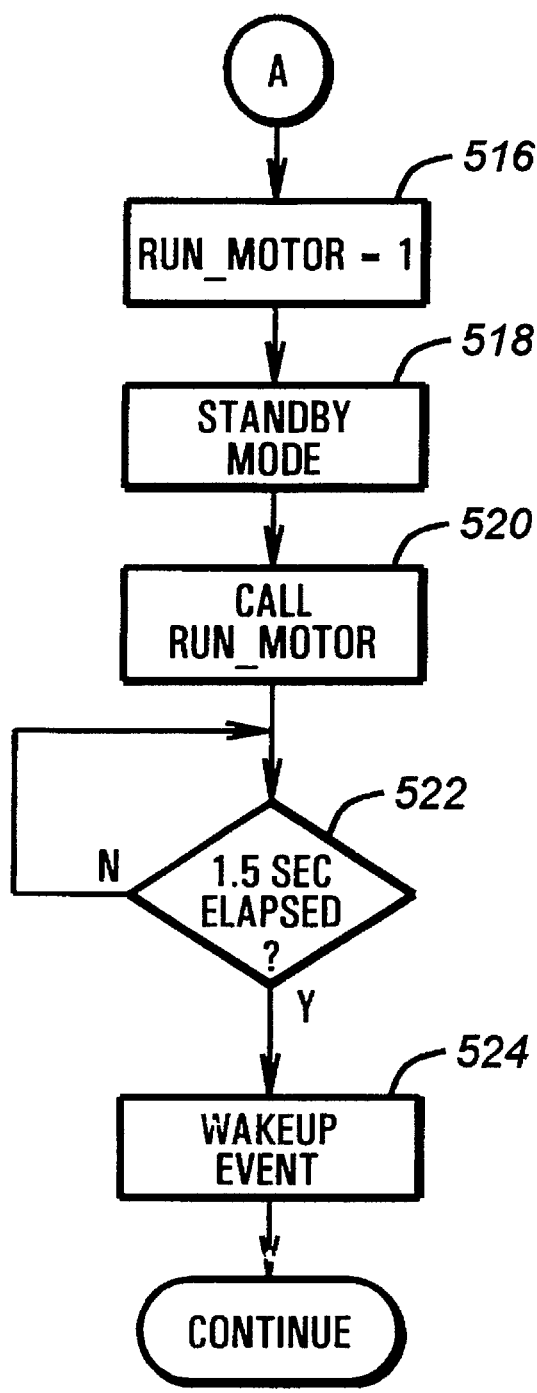

Referring now to FIGS. 7A and 7B, a flow diagram is shown of the steps performed by the notebook computer 10 after the microcontroller 214 has pulsed the signal SENSE. In step 500, in response to the signal DOCSMI\* pulsing low, the ASIC 152 generates an SMI request via the signal EXTSMI\*. The external SMI request signal EXTSMI\* is provided to the system controller 104, which in turn generates an SMI request to the CPU 100 via the signal SMI\*. In response, the CPU 100 invokes a special SMI handler to perform control of the docking and undocking functions of the notebook computer 10. Next, in step 502, a special SMI handler is invoked. Next, in step 504, a flag TARGET_POWER_STATE is set high to indicate that the notebook computer 10 is to be maintained in a power on state. Proceeding now to step 506, a DOCK_EVENT routine in the SMI handler is invoked.

Figure 8:
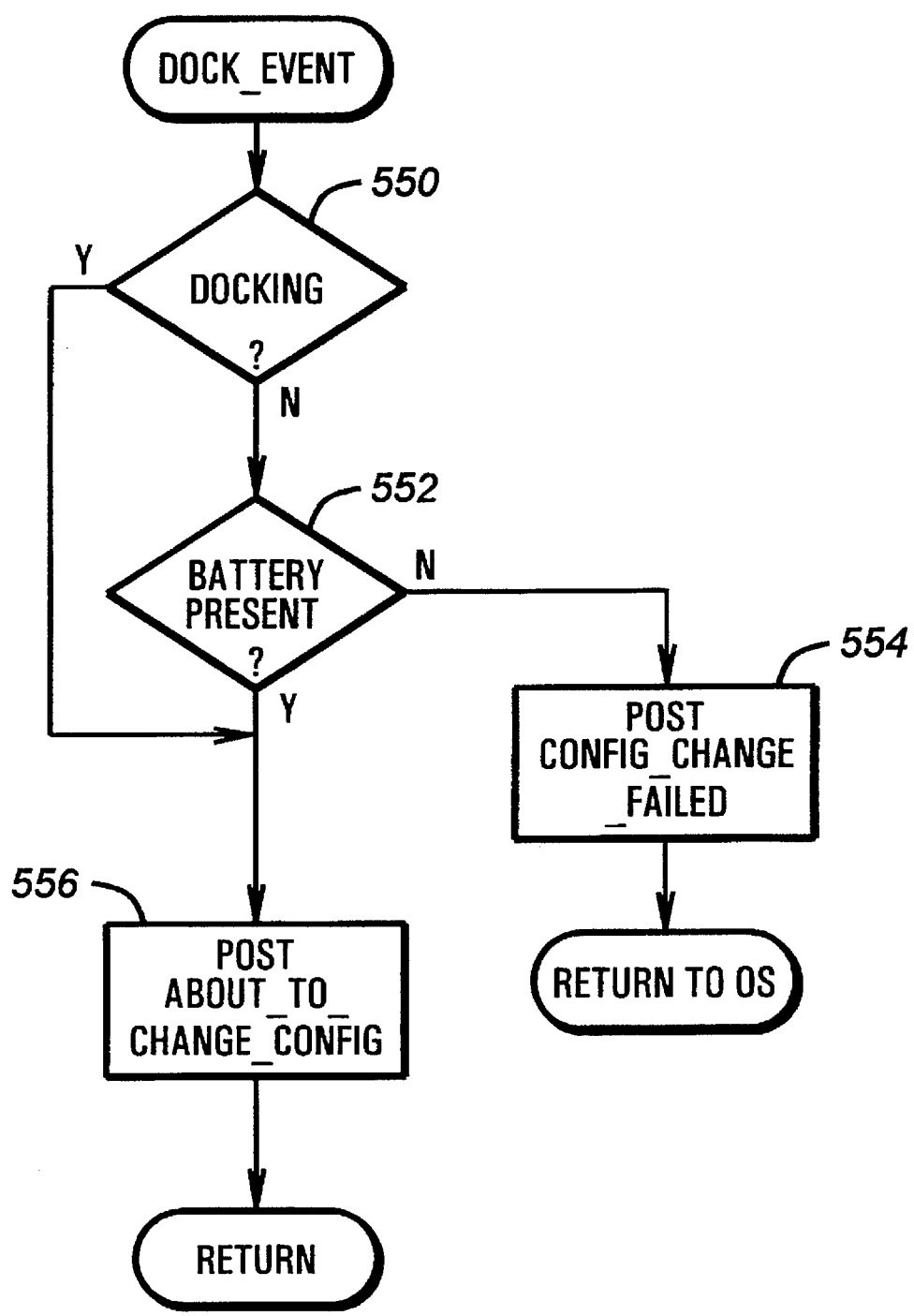
FIG. 8 is a flow diagram of a portion of the SMI handler for recognizing if a docking or undocking operation is occurring.

Referring now to FIG. 8, the DOCK_EVENT routine is described in greater detail. In step 550, it is determined if a docking or undocking event is being requested by looking at the dock ID information. If the dock ID is filled with 0's, that indicates the notebook computer 10 is not docked. Therefore, the external SMI request being asserted indicates a docking request. If docking is being requested, control proceeds to step 556. If undocking is being requested, control proceeds to step 552, where the SMI handler determines if a battery is present. If not, the SMI handler posts a Plug and Play message CONFIG_CHANGE_FAILED in step 554 along with a message indicating that no battery is present. Thus, the operating system is notified of the type of failure that has occurred. If it is determined that the battery is present in step 552, control proceeds to step 556. In step 556, the SMI handler posts a Plug and Play message ABOUT_TO_CHANGE_CONFIG, which informs the operating system that a configuration change is about to be made to the notebook computer 10, including the initiation of a docking or undocking sequence.

Returning now to FIG. 7A, it is determined in step 507 if the operating system has responded to the message ABOUT_TO_CHANGE_CONFIG. In effect, the docking or undocking sequence is suspended in step 507 until the operating system has responded to the posted message. If the operating system responds, control proceeds to step 510, where the operating system retrieves the posted message. In step 512, the operating system determines if the docking or undocking sequence can continue by asserting either an "OK" or "ABORT" message. If the operating system has issued an "ABORT" message, control returns to the SMI handler to continue other SMI functions. If the "OK" message is issued, the operating system proceeds to step 514, where an SMI request is generated via software. In step 516, the SMI handler responds by setting a flag RUN_MOTOR high to indicate that the motor 214 in the base unit 20 is to be activated. Next, in step 518, the SMI handler begins to place the notebook computer 10 into STANDBY mode. The functions performed by the notebook computer 10 in placing itself into STANDBY mode include saving the current state of the keyboard and mouse, turning off the power to the PCMCIA slots 164 and 166, saving the CPU map state, putting the floppy disk controller 146 to sleep, putting the printer port (parallel port) to sleep and turning off the video controller 112. After all such unnecessary components in the notebook computer 10 have been turned off, control proceeds to step 520, where a routine RUN_MOTOR is executed.

Figure 9:
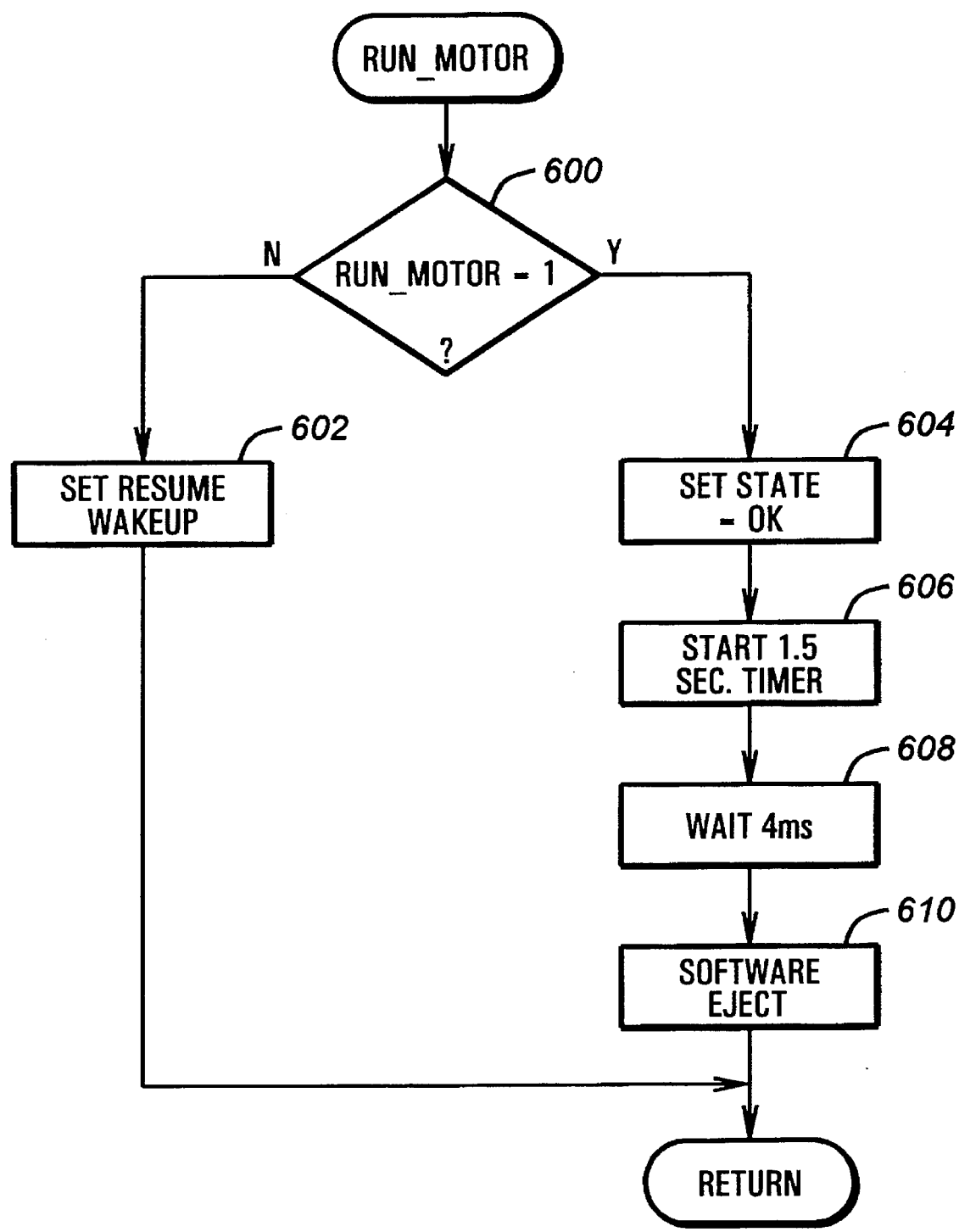
FIG. 9 is a flow diagram of a portion of the SMI handler for setting the notebook computer into the proper state for docking or undocking.

Referring now to FIG. 9, the routine RUN_MOTOR is described in greater detail. In step 600, it is determined if a flag RUN_MOTOR is set high. If not, that indicates that a normal SLEEP or STANDBY procedure has just been executed without a docking or undocking request, that is, the signal DOCSMI\* was not asserted. Thus, control proceeds to step 602, where the SMI handler is set to a state to allow it to wake up from STANDBY mode. From step 602, control returns to step 520 in FIG. 7B. If it is determined that the flag RUN_MOTOR is high in step 600, control proceeds to step 604, where the signal SENSE is set to indicate the state OK. Proceeding next to step 606, the timer in the ASIC 152 is set to run for 1.5 seconds. After the ASIC timer times out, a WAKEUP routine is scheduled as the resume event to awaken the notebook computer 10 from STANDBY mode. Next, in step 608, a delay of approximately 4 milliseconds is asserted. Because of the large capacitances associated with the sense pads 18 and 22, the 4 millisecond delay ensures that the signal SENSE has sufficient time to change to the proper state. Proceeding next to step 610, the SMI handler performs a software eject by writing the register 333 (FIG. 4) with the value 1 to assert the signal EJECTSW high. Thus, if the notebook computer 10 is already connected to the expansion base unit 20, which indicates that an undocking event is being requested, the signal EJECTSW will be pulsed high. However, if the notebook computer 10 is not docked to the expansion base unit 20, the software eject operation is not received by the expansion base unit 20. From step 610, control returns to step 520 in FIG. 7B. Proceeding from step 520 to step 522, it is determined if the 1.5 second timer in the ASIC 152 has timed out. If not, control remains in step 522. After the 1.5 second has elapsed, the scheduled WAKEUP routine is invoked in step 524.

Figure 10:
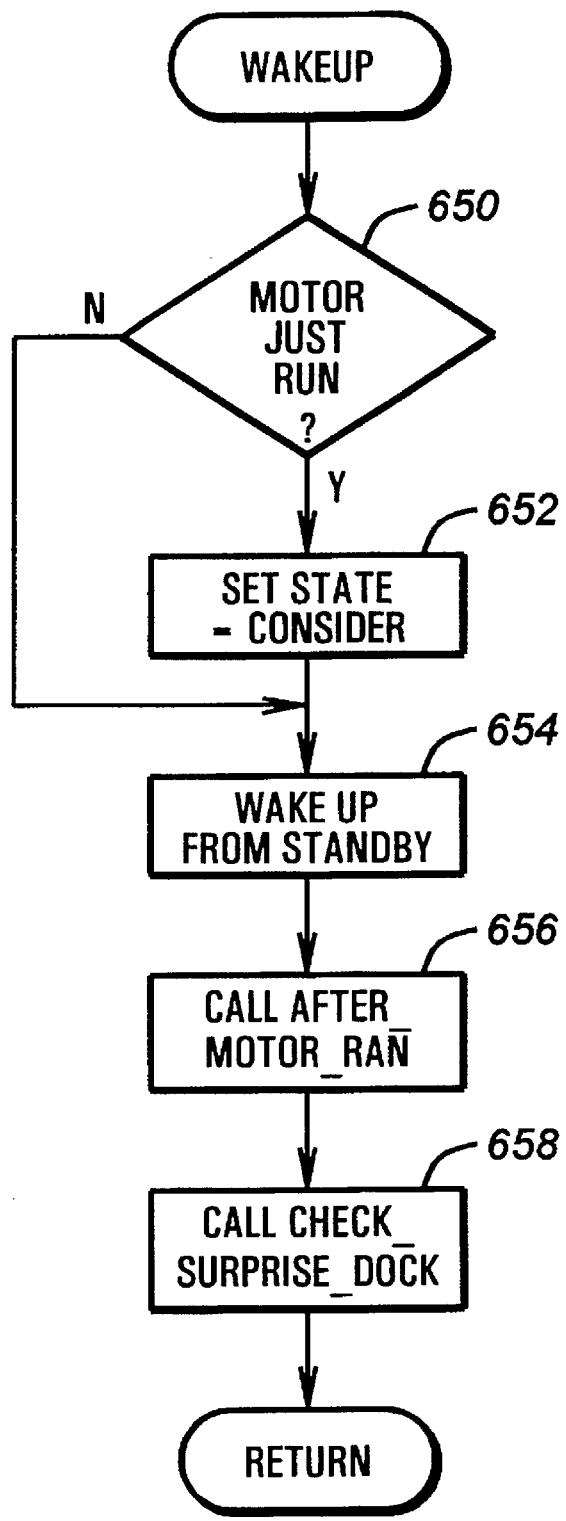
FIG. 10 is a flow diagram of the wake up routine in the SMI handler for awakening the notebook computer of FIG. 1 from STANDBY mode.

Referring now to FIG. 10, a flow diagram of the WAKEUP routine is shown. It is noted that the WAKEUP routine, in addition to being set as a resume event by the ASIC timer, is also invoked whenever the notebook computer 10 awakens from STANDBY mode. In step 650, it is determined if the motor 218 has just run. If not, the state of the signal SENSE is not changed and control proceeds to step 654. If it is determined in step 650 that the motor 218 has just run, control proceeds from step 650 to step 652, where the signal SENSE is changed to indicate the state CONSIDER. This prevents a docking event from occurring while the notebook computer 10 is waking up its components from STANDBY mode. Control proceeds next to step 654, where the notebook computer 10 is awakened from STANDBY mode. In step 654, the video controller 112 is turned on, the printer port (parallel port 140) is woken up, the CPU map state is restored, power to the PCMCIA slots 164 and 166 are restored, the state of the serial port 138 is restored, the keypad and mouse interfaces 136 and 142 are activated, and the state of the keyboard 136 and mouse 142 are restored. Proceeding next to step 656, a routine AFTER_MOTOR_RAN is executed.

Figure 11A:
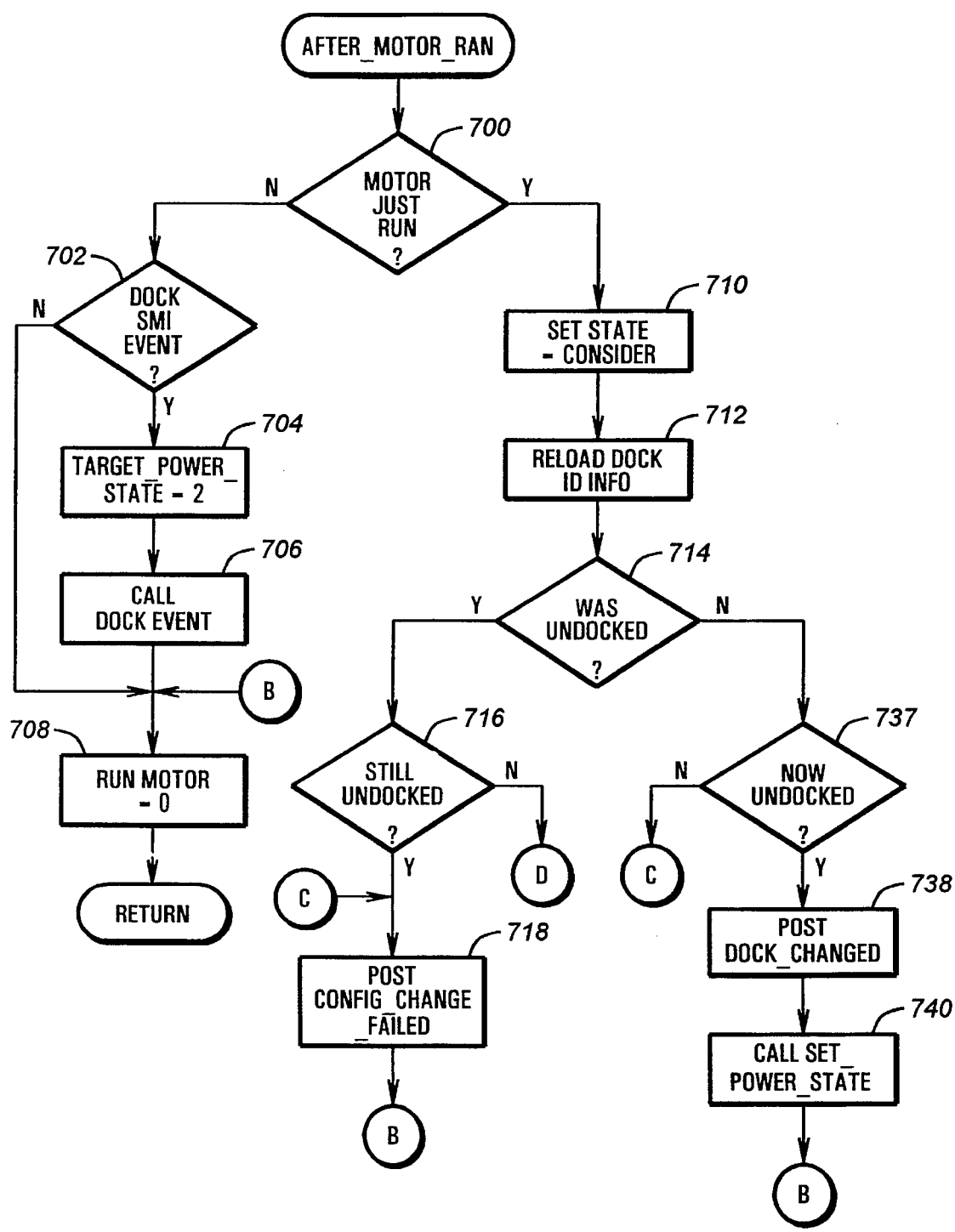
FIGS. 11A and 11B are a flow diagram of a portion of the SMI handler for controlling the notebook computer after a docking or undocking operation.
Figure 11B:
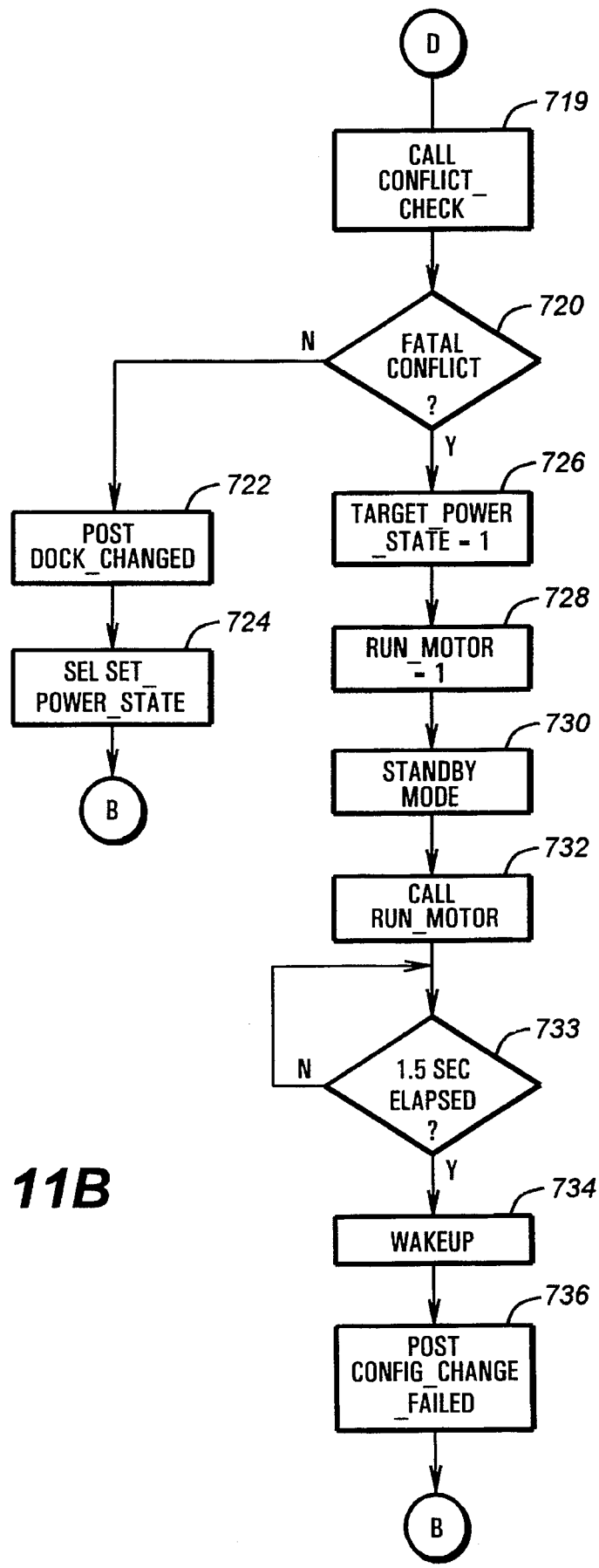

Referring now to FIGS. 11A and 11B, the flow diagram of the routine AFTER_MOTOR_RAN is shown. In step 700, it is determined if the motor has just run. If not, that indicates that the notebook computer 10 is simply waking up from STANDBY mode. Control then proceeds to step 702, where it is determined if there is a pending SMI event and if that event is a docking or undocking event. If not, control proceeds directly to step 708. If it is determined in step 702 that a docking or undocking event is requested, control proceeds to step 704, where the flag TARGET_POWER_STATE is set to the value 2 to indicate that the notebook computer 10 is to be placed into STANDBY mode. Control then proceeds to step 706, where the routine DOCK_EVENT is called (FIG. 8). From step 706, control proceeds to step 708, where the flag RUN_MOTOR is set to 0 to indicate that the motor 218 is not to be activated. From step 708, control returns to step 656 in FIG. 10.

If it is determined in step 700 that the motor 218 has just run, control proceeds from step 700 to step 710, where the signal SENSE is set to the state CONSIDER. This allows the microcontroller 214 in the expansion base unit 20 to respond to future docking or undocking requests. From step 710, control proceeds to step 712, where the dock ID information is reloaded. Control proceeds next to step 714, where it is determined if the notebook computer 10 was previously docked or undocked. Whether the notebook computer 10 is docked or undocked is determined by the signal EBOX*. If EBOX* is asserted low, that indicates the expansion base unit 20 is attached. Otherwise, the notebook computer 10 is not docked. If it is determined that the notebook computer 10 was previously undocked, control proceeds to step 716, where it is determined if the notebook computer 10 is currently docked or undocked. It is anticipated that since the motor has just run, the notebook computer 10 would have gone from an undocked state to a docked state. If it is determined in step 716 that the notebook computer 10 is still undocked, control proceeds to step 718, where the SMI handler 310 posts a message CONFIG_CHANGE_FAILED to the operating system along with a hardware error message. The hardware error message indicates to the operating system that a hardware failure has occurred during a docking or undocking sequence. From step 718, control returns to step 656 in FIG. 10. If it is determined in step 716 that the notebook computer 10 is currently docked, control proceeds to step 719 where a resource conflict check is performed.

Figure 12A:
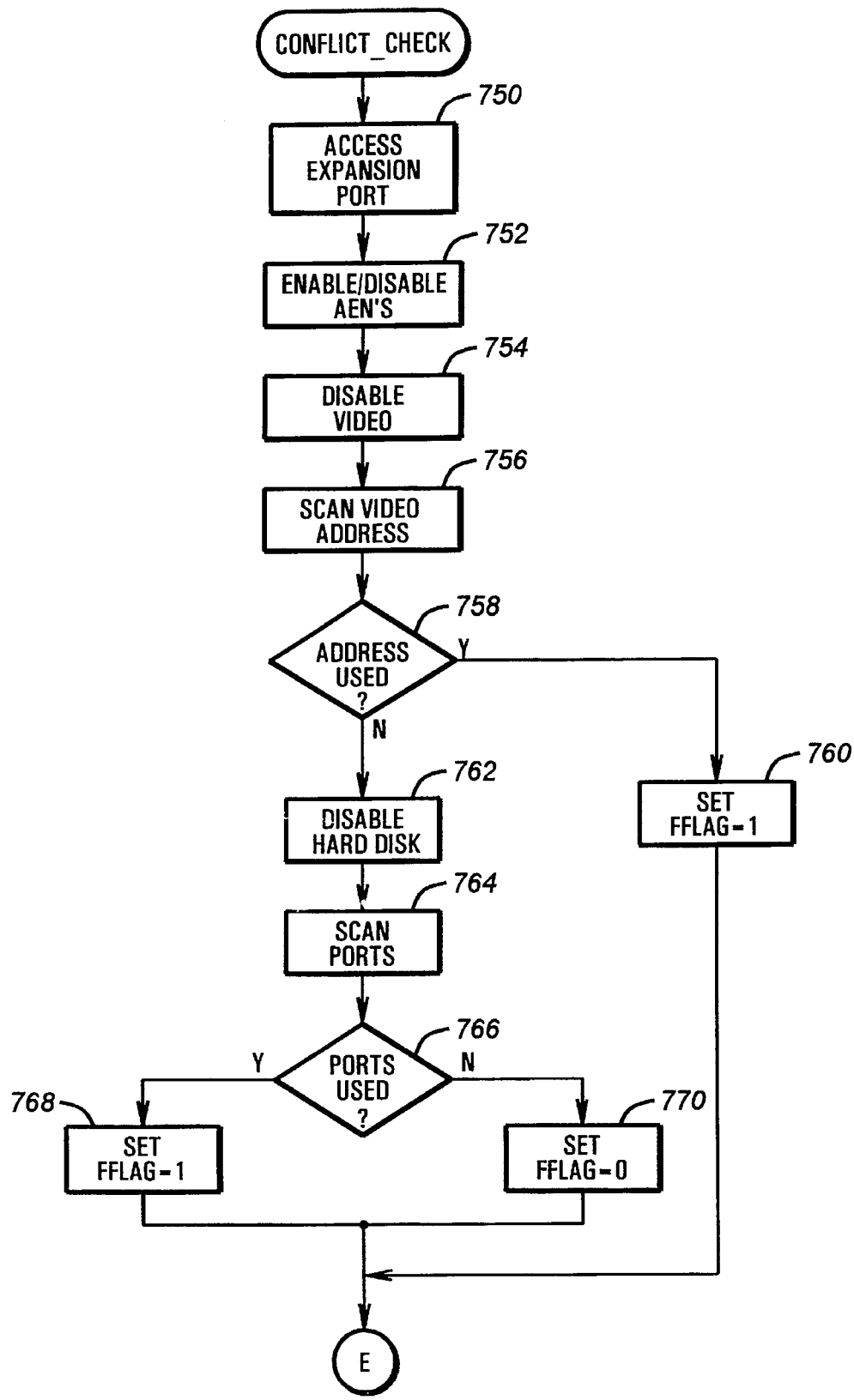
FIG. 12A and 12B are a flow diagram of a portion of the SMI handler for performing a conflict check.
Figure 12B:
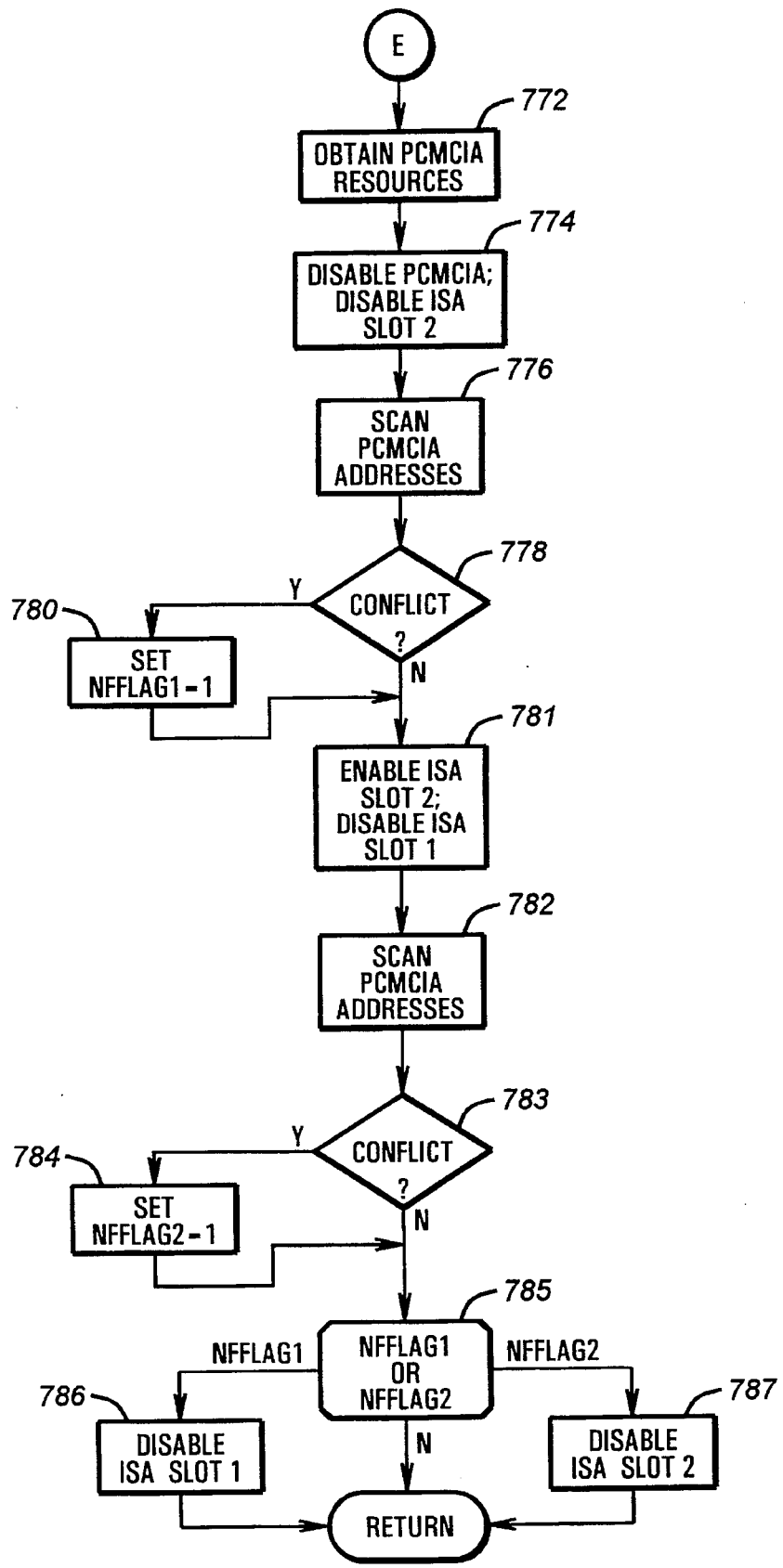

Referring now to FIGS. 12A and 12B, a flow diagram of the conflict check routine is shown. In step 750, the SMI handler accesses the expansion port 162, which is connected to the expansion base unit 20, to enable or disable certain devices in the expansion base unit 20. As described above, the devices involved are the hard disk drive 258, the SCSI controller 224, the Ethernet controller 226, and ISA slots 266 and 268. In step 752, the SMI handler enables all the devices in the expansion base unit 20 except the hard disk drive 258. However, it is noted that, in the preferred embodiment, the hard disk drive 258 can be enabled if a SET SYSTEM DEVICE NODE BIOS call is issued. This would cause the operating system to configure the hard disk drive 258 such that its resource requirements do not conflict with those of the hard disk drive 127 in the notebook computer 10. For more information on the SET SYSTEM DEVICE NODE function, refer to the Plug and Play BIOS Specification (1994). The hard disk drives 127 and 258 can interchangeably be set as the C and D drives. If the switch 215 (FIG. 3A) is set high, thereby driving the signal PRIMARY high, the hard disk drive 258 in the expansion base unit 20 will be the primary or C drive, and the hard disk drive 127 in the notebook computer 10 will be the D drive. The designations are switched when the switch 342 is set low.

Proceeding next to step 754, access to the video BIOS in the flash EEPROM 130 is denied to disable the video controller 112. The video ROM memory range, which is preferably 32 Kbytes, is scanned to determine if another video controller is inserted into one of the expansion slots 266 and 268 in the expansion base unit 20. In step 758, if it is determined that the memory range is used by another expansion device, control proceeds to step 760, where a fatal conflict flag FFLAG is set high to indicate that a conflict has occurred. From step 760, control proceeds to step 772. If in step 758, it is determined that the memory range corresponding to the video BIOS is not used, control proceeds to step 762, where the hard disk drive 127 is disabled. Next, in step 764, the eight I/O ports corresponding to the base address of the primary hard drive (either disk drive 127 or 258 depending on the state of the switch 215) are scanned. In step 766, if the I/O addresses corresponding to any of the scanned I/O ports are used, control proceeds to step 768, where the fatal conflict flag FFLAG is set high. Otherwise, control proceeds to step 770, where the flag FFLAG is cleared. From either step 768 or step 770, control proceeds to step 772.

Proceeding next to step 772, the resource information for the PCMCIA cards inserted into PCMCIA slots 164 and 166 are obtained. The resource information include memory and I/O addresses, DMA channels and interrupt levels. This information is available from the NVRAM 154 or from the PCMCIA card. Proceeding next to step 774, the PCMCIA slots 164 and 166 are disabled. Next, the ISA slot 266 in the expansion base unit 20 is disabled by disabling the AEN signal SL2AEN. The ISA slot 268 remains enabled. Next in step 776, the addresses corresponding to the resource information of any inserted PCMCIA cards are scanned. Proceeding next to step 778, it is determined if a conflict occurred. If so, control proceeds to step 780, where a non-fatal conflict flag NFFLAG1 is set high. This flag corresponds to the ISA slot 268, as only expansion devices inserted into either of ISA slots 266 or 268 are capable of conflicting with the PCMCIA devices in the preferred embodiment, though this arrangement could be extended to the SCSI controller 224 and Ethernet controller 226 if desired. Thus, when the flag NFFLAG1 is asserted high, that indicates that the resource requirements of the expansion device inserted into ISA slot 268 conflict with the resource requirements of one of the PCMCIA slots 164 and 166. From either step 778 or 780, control proceeds to step 781, where the ISA slot 266 is enabled and the ISA slot 268 is disabled. A second scan of the PCMCIA addresses is performed in step 782. Proceeding next to step 783, it is determined if a conflict occurred as a result of the second scan. If so, control proceeds to step 784, where a non-fatal conflict flag NFFLAG2 is set high. The flag NFFLAG2 corresponds to the ISA slot 266. From either of steps 783 or 784, control proceeds to step 785, where it is determined if either of the non-fatal conflict flags NFFLAG1 or NFFLAG2 is set high. If the flag NFFLAG1 is set high, control proceeds to step 786, where the ISA slot 268 is disabled by disabling the signal SL1AEN. If the flag NFFLAG2 is set high in step 785, control proceeds to step 787, where the ISA slot 266 is disabled by disabling the signal SL2AEN. If both the flags NFFLAG1 and NFFLAG2 are high, control proceeds to both steps 786 and 787. If neither of the flags NFFLAG1 or NFFLAG2 is set high, control returns to step 720 in FIG. 11B. It is noted that the treatment of a non-fatal conflict and a fatal conflict is different. In the case of a fatal conflict involving the video controller 112 and the hard disk drive 127 or 258, the notebook computer 10 must be ejected from the expansion base unit 20 because the computer 10 may not boot correctly. A non-fatal conflict, on the other hand, may be removed by disabling the devices connected to the appropriate ISA slot 266 or 268. It is also noted that the description provided of how a conflict with a PCMCIA address is determined was rather simplistic. For a more detailed description of how conflicts are found, refer to patent application Ser. No. 08/145,400, entitled "Method of and Apparatus for Disabling Individual Slots on a Computer Bus," patent application Ser. No. 08/145,339, entitled "Detecting the Presence of a Device on a Computer System Bus by Measuring the Response Time of Data Signals on the Bus, and Maximizing System Performance Based on that Response Time," and patent application Ser. No. 08/145,338, entitled "Method of Determining the Configuration of Devices Installed on a Computer Bus," all filed on Oct. 29, 1993 and all of which are hereby incorporated by reference. It is also noted that the PCMCIA card is the most likely candidate to cause a conflict and so has been used as the example in this description. It is understood that this non-fatal conflict checking can apply to other devices in the notebook computer 10 not needed for booting, such as the serial and parallel ports.

Returning now to FIG. 11B, control next proceeds to step 720, where it is determined if a fatal resource conflict has occurred as indicated by the CONFLICT flag. If no conflict occurs, control proceeds to step 722, where a message DOCK_CHANGED is posted to the operating system. This indicates to the operating system that the notebook computer 10 has been successfully docked. Proceeding next to step 724, a routine SET_POWER_STATE is invoked.

Figure 13:
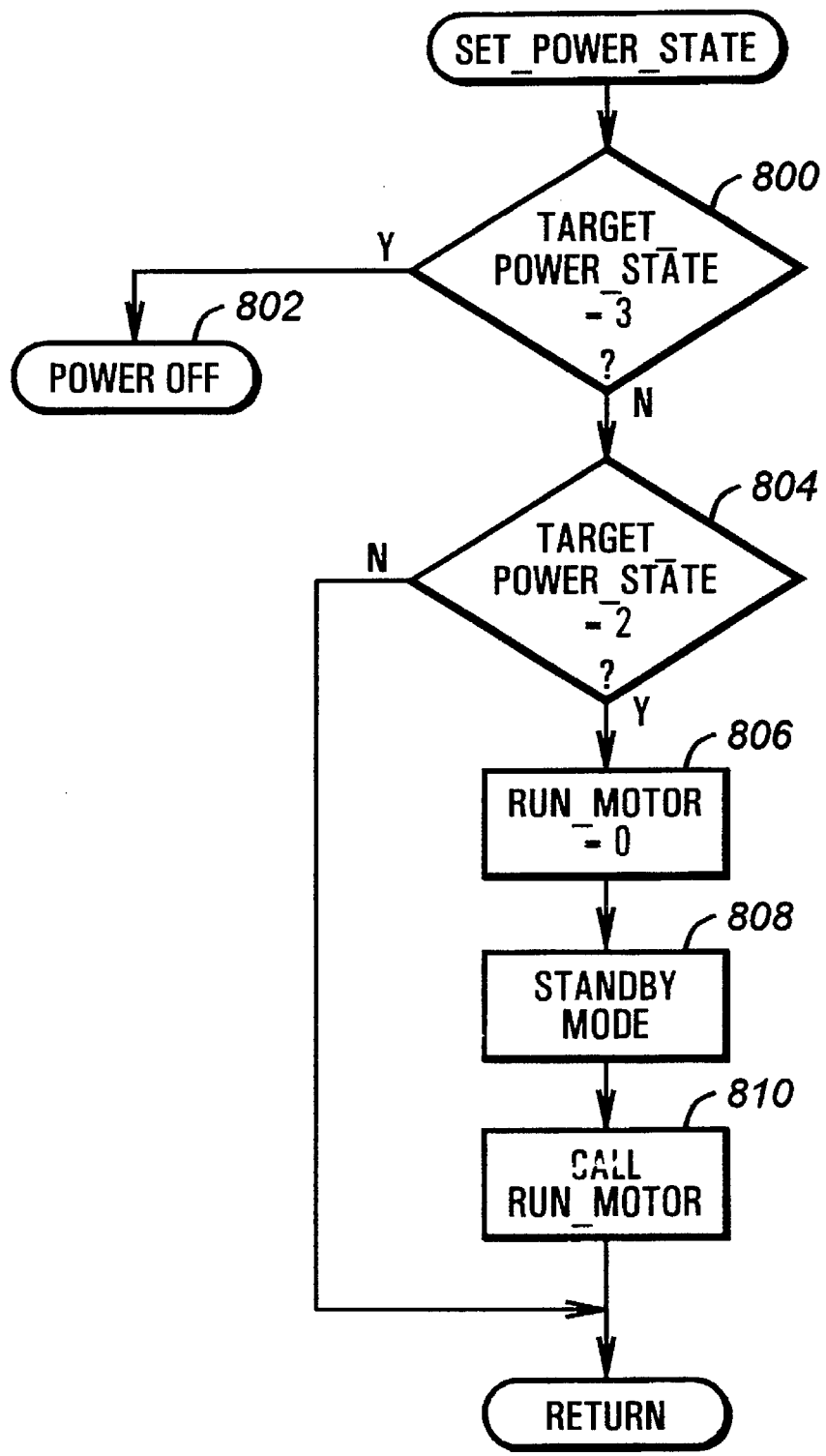
FIG. 13 is a flow diagram of a portion of the SMI handler for setting the state of the notebook computer of FIGS. 1.

Referring now to FIG. 13, a flow diagram of the routine SET_POWER_STATE is shown. In step 800, it is determined if the value of the flag TARGET_POWER_STATE is equal to 3. If so, that indicates that the notebook computer 10 is to be turned off and control proceeds to step 802. In step 802, the power off sequence is invoked to shut the notebook computer 10 down. If the value of the flag TARGET_POWER_STATE is not equal to 3, control proceeds to step 804, where it is determined if the flag TARGET_POWER_STATE is equal to 2. If so, that indicates the notebook computer 10 is to be placed into STANDBY mode, in which case control proceeds to step 806, where the flag RUN_MOTOR is set equal to 0 to indicate that the motor 218 is not to be activated. Control then proceeds to step 808, where the notebook computer 10 is placed into STANDBY mode. After the notebook computer 10 is placed into STANDBY mode, the routine RUN_MOTOR (FIG. 9) is invoked in step 810. However, since the flag RUN_MOTOR has been set low in step 806, the motor 218 is not activated in step 810. From step 810, control returns to the routine AFTER_MOTOR_RAN in FIG. 11. In step 804, if it is determined that the flag TARGET_POWER_STATE is not equal to 2, then that indicates the notebook computer 10 is to be kept in the power on state. Control thus returns directly from step 804 back to the routine AFTER_MOTOR_RAN.

Returning now to FIG. 11B, after the routine SET_POWER_STATE has been run in step 724, control proceeds to step 708, where the flag RUN_MOTOR is set equal to 0. From step 724, control is returned to step 654 in FIG. 10.

Returning now to step 720, if it is determined that a fatal resource conflict has occurred as indicated by the fatal conflict flag, control proceeds to step 726, where the flag TARGET_POWER_STATE is set to the value 1. This indicates that the notebook computer 10 is to be kept in the power on state. From state 726, control proceeds to step 728, where the flag RUN_MOTOR is set high to indicate that the motor is to be activated. Next, in step 730, the notebook computer 10 is placed into STANDBY mode. Proceeding next to step 732, the routine RUN_MOTOR is invoked to eject the notebook computer 10. As discussed above, the routine RUN_MOTOR causes a software eject request to be asserted to the expansion base unit 20. In response, the microcontroller 214 asserts control signals to the motor 218 to eject the notebook computer 10. After the notebook computer 10 has been ejected, control remains in step 733 until the 1.5 second timer times out. When that occurs, the scheduled resume event, the WAKEUP routine, is invoked in step 734 to awaken the notebook computer 10 from STANDBY mode. As discussed previously, the WAKEUP routine calls the routine AFTER_MOTOR_RAN to determine if the notebook computer 10 has been ejected. Two conditions may cause the notebook computer 10 not to eject: the key lock 50 is enabled, or an oversized PCMCIA card or PCMCIA card with an attached cable is inserted into one of the two PCMCIA slots 164 and 166. In that case, control proceeds to step 718, where the message CONFIG_CHANGE_FAILED is posted with a hardware error message. After control is returned from the routine WAKEUP, another message CONFIG_CHANGE_FAILED is posted in step 736 with a resource conflict message. Thus, the operating system software will be aware that a resource conflict has occurred but an ejection has failed. The operating system will thus notify the user of such error conditions.

It is noted that, although the external SMI handler is invoked only when the expansion base unit 20 detects that the notebook computer 10 is in the state CONSIDER, the conflict check routine is performed after any docking operation. If the notebook computer 10 was in the state OK before docking, it must be awakened from the state STANDBY by the WAKEUP routine. As a result, the conflict check routine is called when it is determined that the motor has just run. In addition, if the notebook computer 10 was in the state ALWAYS, that is, it is powered off, the POST procedure run during rebooting also accesses the WAKEUP routine. Thus, it is guaranteed that, after a docking operation, a resource conflict will be found.

Returning now to step 714, if it is determined that the notebook computer 10 was previously docked, control proceeds to step 737, where it is determined if the notebook computer 10 is currently docked or undocked. Since the notebook computer 10 was previously docked and the motor has just run, it is anticipated that the notebook computer 10 should be ejected. If it is determined in step 737 that the notebook computer 10 is still docked to the expansion base unit 20, control proceeds to step 718, where the SMI handler posts the message CONFIG_CHANGE_FAILED with a hardware error message. If it is determined in step 736 that the notebook computer 10 is undocked, control proceeds to step 738, where the message DOCKED_CHANGED is posted to indicate to the operating system that the notebook computer 10 has been successfully ejected. Proceeding next to step 740, the routine SET_POWER_STATE is invoked to properly place the notebook computer 10 in the desired mode (ON, STANDBY or OFF), as determined by the state of the flag TARGET_POWER_STATE. From step 740, control proceeds to step 708.

After control returns to step 656 in FIG. 10, control proceeds next to step 658. It is noted that the notebook computer 10 is designed for use with inexpensive expansion base units, that is, those units without motorized docking. In those units, cold docking is permitted, but not hot docking. Cold docking occurs when the notebook computer 10 is inserted into the expansion base unit while in the OFF state. After the notebook computer 10 turned on, the booting process determines the presence of the expansion base unit 20. As a result, no further action is required by the operating system. Warm docking occurs when the notebook computer 10 is placed into STANDBY mode before it is inserted into the expansion base unit 20. When used with the inexpensive expansion base units, the SMI handler does not post the message ABOUT_TO_CHANGE_CONFIG to the operating system. As a result, the operating system running on the notebook computer 10 has no way of knowing that it has been docked to the expansion base unit 20. Thus, in step 658, the routine CHECK_SURPRISE_DOCK is performed to determine if the notebook computer 10 has been attached to the expansion base unit 20. If so, the routine CHECK_SURPRISE_DOCK issues a message DOCK_CHANGED to the operating system. From step 658, control returns to step 524 in FIG. 7B, or to whichever program called the WAKEUP routine. After the WAKEUP routine has occurred in step 524, the SMI handler continues to perform other SMI functions.

Thus, a notebook computer system has been described that docks to a motorized expansion base unit. Before the actual docking event occurs, the notebook computer system communicates with the expansion base unit via a sense signal, which is provided by the notebook computer to indicate the power state of the notebook computer. If the expansion base unit determines that the notebook computer is in a proper state for docking, it activates its motor to load the notebook computer. Once docked, the notebook computer runs a resource conflict check routine to determine if resource conflicts occur. A fatal conflict occurs when the resource requirements of bus devices connected to the expansion base unit conflict with the boot resource requirements of a video controller or hard disk drive connected to the notebook computer. When such a fatal conflict occurs, the notebook computer issues a software eject request to expansion base unit. In response, the expansion base unit undocks the notebook computer. A non-fatal conflict occurs when the resource requirements of the expansion base unit devices conflict with the resource requirements of PCMCIA cards inserted into the PCMCIA slots of the notebook computer. Unlike the case of a fatal conflict, the notebook computer responds to a non-fatal conflict by disabling the offending devices in the expansion base unit.

The foregoing disclosure and description of the invention are illustrative and explanatory thereof, and various changes in the size, shape, materials, components, circuit elements, wiring connections and contacts, as well as in the details of the illustrated circuitry and construction and method of operation may be made without departing from the spirit of the invention.

I claim:

1. A docking computer system, comprising:
 a portable computer system, including:
  an expansion bus;
  an expansion connector coupled to said expansion bus; and
  a device being coupled to said expansion bus and having resource requirements; and
 an expansion base system for docking or undocking said portable computer system, wherein said expansion base system includes:
  an expansion bus;
  a docking connector coupled to said expansion base system expansion bus for connection to said expansion connector when said portable computer system is docked to said expansion base system;
  an expansion slot coupled to said expansion base system expansion bus for connection to an expansion device having resource requirements; and
  a slot disabler coupled to said expansion slot for disabling said expansion slot,
 wherein said portable computer system fisher includes:
  a conflict decoder coupled to said portable computer system expansion bus for determining if said resource requirements of said portable computer system device and said expansion device conflict after said portable computer system has docked to said expansion base system; and
  a command decoder coupled to said conflict decoder and said portable computer system expansion bus for activating said slot disabler to disable said expansion slot if said resource conflict is present and is non-fatal and otherwise insulating said portable computer system said expansion base system.

2. The docking computer system of claim 1, wherein said expansion base system further includes:
 a second expansion slot coupled to said expansion base system expansion bus for connection to a second expansion device having resource requirements, wherein said slot disabler can disable said second expansion slot, wherein said conflict decoder further determines if said resource requirements of said portable computer system device and said second expansion device conflict, and wherein said command decoder further activates said slot disabler to disable said second expansion slot if said resource conflict is present.

3. The docking computer system of claim 1, wherein said portable computer system device is a PCMCIA card.

4. The docking computer system of claim 1, wherein said portable computer system further includes:
 an address enable generator coupled to said portable computer system expansion bus for generating an address enable signal to select said expansion slot, and
 wherein said slot disabler blocks said address enable signal to said expansion slot.

5. The docking computer system of claim 4, wherein said slot disabler includes a buffer having an input receiving said address enable signal and an output providing an enable signal at a logic level corresponding to that of said address enable signal to said expansion slot, and wherein said buffer does not provide said enable signal at said output when said slot disabler is activated by said command decoder.

6. The docking computer system of claim 5, wherein said command decoder writes a data bit to said slot disabler to activate said slot disabler, and wherein said slot disabler further includes:
 a latch coupled to said expansion base system expansion bus for latching said data bit provided by said command decoder, wherein said data bit determines whether said buffer provides said address enable signal to said expansion slot.

7. A method of identifying and resolving conflicts after a portable computer system has been docked to an expansion base system, wherein the portable computer system includes an expansion bus, an expansion connector connected to the expansion bus, and a device being coupled to the expansion bus and corresponding to a predetermined address range, and wherein the expansion base system includes an expansion bus, a docking connector being connected to the expansion base system expansion bus and for connection to the expansion connector when the portable computer system is docked at the expansion base system, and a first expansion slot coupled to said expansion base system expansion bus for connection to a first expansion device, the method comprising the steps of:

insulating said portable computer system from said expansion base system if a fatal conflict is present and otherwise, (a) disabling the portable computer system device;

(b) performing a plurality of accesses to the portable computer system expansion bus with address values within the predetermined address range corresponding to the portable computer system device;

(c) determining if the first expansion device responds to said expansion bus accesses; and (d) disabling the first expansion slot if the first expansion device responds to said expansion bus accesses.

8. The method of claim 7, wherein the expansion base system further includes a second expansion slot coupled to said expansion base system expansion bus for connection to a second expansion device, and wherein the method further comprises the steps of:

(e) disabling the first expansion slot;

(f) performing a plurality of accesses to the portable computer system expansion bus with address values within the predetermined address range corresponding to the portable computer system device;

(g) determining if said second expansion device responds to said expansion bus accesses;

(h) disabling said second expansion slot if said second expansion device responds to said expansion bus accesses; and (i) enabling said first expansion slot after step (h) if said first expansion slot is not disabled in step (d).

9. A method of identifying and resolving conflicts after a portable computer system has been docked to an expansion base system, wherein the portable computer system includes an expansion bus, an expansion connector connected to the expansion bus, and a device being coupled to the expansion bus and having a PCMCIA resource requirement, and wherein the expansion base system includes an expansion bus, s docking connector being connected to the expansion base system expansion bus and for connection to the expansion connector when the potable computer system is docked at the expansion base system, and a first expansion slot coupled to said expansion base system expansion bus for connection to a first expansion device, the method comprising the steps of:

(a) disabling the portable computer system device;

(b) performing a plurality of accesses to the portable computer system expansion bus with address values within said PCMCIA resource requirement corresponding to the portable computer system device;

(c) determining if the first expansion device responds to said expansion bus accesses; and (d) disabling the first expansion slot if the first expansion device responds to said expansion bus accesses.

10. The method of claim 9, wherein the expansion base system further includes a second expansion slot coupled to said expansion base system expansion bus for connection to a second expansion device, and wherein the method further comprises the steps of;

(e) disabling the first expansion slot;

(f) performing a plurality of accesses to the portable computer system expansion bus with address values within said PCMCIA resource requirement corresponding to the portable computer system device;

(g) determining if said second expansion device responds to said expansion bus accesses;

(h) disabling said second expansion slot if said second expansion device responds to said expansion bus accesses; and (i) enabling said first expansion slot after step (h) if said first expansion slot is not disabled in step (d).

11. A docking computer system, comprising:

a portable computer system, including:
an expansion bus;
an expansion connector coupled to said expansion bus; and
a device being coupled to said expansion bus and having resource requirements; and an expansion base system for docking or undocking said portable computer system, wherein said expansion base system includes;
an expansion bus;
a docking connector coupled to said expansion base system expansion bus for connection to said expansion connector when said portable computer system is docked to said expansion base system;
an expansion slot coupled to said expansion base system expansion bus for connection to an expansion device having PCMCIA resource requirements; and
a slot disabler coupled to said expansion slot for disabling said expansion slot, wherein said portable computer system further includes:
a conflict decoder coupled to said portable computer system expansion bus for determining if said PCMCIA resource requirements of said portable computer system device and said expansion device resources requirements conflict after said portable computer system has docked to said expansion base system; and
a command decoder coupled to said conflict decoder and said portable computer system expansion bus for activating said slot disabler to disable said expansion slot if said resource conflict is present.

12. The docking computer system of claim 11, wherein said expansion base system further includes;

a second expansion slot coupled to said expansion base system expansion bus for connection to a second expansion device having resource requirements, wherein said slot disabler can disable said second expansion slot, wherein said conflict decoder further determines if said resource requirements of said portable computer system device and said second expansion device conflict, and wherein said command decoder further activates said slot disabler to disable said second expansion slot if said resource conflict is present.

13. The docking computer system of claim 11, wherein said portable computer system further includes:

an address enable generator to said portable computer system expansion bus for generating an address enable signal to select said expansion slot, and wherein said slot disabler blocks said address enable signal to said expansion slot.

14. The docking computer system of claim 13, wherein said slot disabler includes a buffer having an input receiving said address enable signal and an output providing an enable signal at a logic level corresponding to that of said address enable signal to said expansion slot, and wherein said buffer does not provide said enable signal at said output when said slot disabler is activated by said command decoder.

15. The docking computer system of claim 13, wherein said command decoder writes a data bit to said slot disabler to activate said slot disabler, and wherein said slot disabler futher includes:

a latch coupled to said expansion base system expansion bus for latching said data bit provided by said command decoder, wherein said data bit determines whether said buffer provides said address enable signal to said expansion slot.

16. A portable computer system adapted to dock with an expansion base system, the expansion base system having an expansion bus, a docking connector coupled to said expansion base system expansion bus, an expansion slot coupled to said expansion base system expansion bus for connection to an expansion device having resource requirements, and a slot disabler coupled to said expansion slot for disabling said expansion slot, the portable computer system including:

an expansion bus;

an expansion connector coupled to said expansion bus, said expansion connector adapted to connect to said docking connector when said portable computer system is docked to said expansion base system; and a device being coupled to said expansion bus and having PCMCIA resource requirements; and a conflict decoder coupled to said portable computer system expansion bus for determining if said PCMCIA resource requirements of said portable computer system device and said expansion device resource requirements conflict after said portable computer system has docked to said expansion base system; and a command decoder coupled to said conflict decoder and said portable computer system expansion bus for activating said slot disabler to disable said expansion slot if said resource conflict is present.

* * * * *

UNITED STATES PATENT AND TRADEMARK OFFICE
CERTIFICATE OF CORRECTION

PATENT NO. : 5,596,728 Page 1 of 1
DATED : January 21, 1997
INVENTOR(S) : Brian V. Belmont It is certified that error appears in the above-identified patent and that said Letters Patent is hereby corrected as shown below:

Column 22,
Line 18, delete "fisher" and insert -- further --.

Column 23,
Line 53, delete "s" and insert -- a --.

Signed and Sealed this

Twenty-fourth Day of January, 2006

JON W. DUDAS
*Director of the United States Patent and Trademark Office*